(12) United States Patent
Keiichi

(10) Patent No.: US 7,529,475 B2
(45) Date of Patent: May 5, 2009

(54) OPTICAL SYSTEM

(75) Inventor: Kuba Keiichi, Koganei (JP)

(73) Assignee: Olympus Corporation, Tokyo (JP)

(*) Notice: Subject to any disclaimer, the term of this patent is extended or adjusted under 35 U.S.C. 154(b) by 596 days.

(21) Appl. No.: 11/132,322

(22) Filed: May 19, 2005

(65) Prior Publication Data

US 2005/0259157 A1 Nov. 24, 2005

(30) Foreign Application Priority Data

May 21, 2004 (JP) ............................. 2004-151200
Jun. 11, 2004 (JP) ............................. 2004-173766

(51) Int. Cl.
 *G03B 17/00* (2006.01)
 *G03B 13/10* (2006.01)
 *H04N 5/228* (2006.01)
 *G02B 27/64* (2006.01)

(52) U.S. Cl. .................. 396/55; 396/378; 348/208.11; 359/557

(58) Field of Classification Search ............. 396/52–55, 396/373, 378–381; 348/208.99, 208.1–208.8, 348/208.11–208.16; 359/554–557
See application file for complete search history.

(56) References Cited

U.S. PATENT DOCUMENTS

| 5,557,458 A * | 9/1996 | Itoh ............................ 359/434 |
| 5,625,488 A * | 4/1997 | Dietzsch et al. ............. 359/435 |
| 6,226,459 B1 * | 5/2001 | Hamada et al. ............... 396/54 |

FOREIGN PATENT DOCUMENTS

| JP | 09-329820 | 12/1997 |
| JP | 2003-091027 | 3/2003 |

* cited by examiner

*Primary Examiner*—Rochelle-Ann J Blackman
(74) *Attorney, Agent, or Firm*—Kenyon & Kenyon LLP

(57) ABSTRACT

An optical system comprising a photographing optical system, a finder optical system and optical path changing means for changing an optical path from the photographing optical system to the finder optical system or an optical system for observing an image of an object after rays from an object to be photographed are reflected twice or more times comprising camera shake correction means disposed in a finder optical system.

18 Claims, 32 Drawing Sheets

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

TANGENTIAL

SAGITAL

OPTICAL SYSTEM

BACKGROUND OF THE INVENTION a) Field of the Invention

The present Invention relates to an optical system. Concretely, the present invention relates to an optical system which has a function to prevent an image from being blurred due to a camera shake, for example, a shake caused in particular at a time of photographing with a camera held by hands, and more specifically a finder for a photographing apparatus such as a digital camera, a film camera, a video camera or the like.

b) Description of the Prior Art

Known as conventional examples of finder optical system which has a camera shake correction function are those which are described in the following literatures:

Japanese Patent Kokai Application No. Hei 9-329820
Japanese Patent Kokai Application No. 2003-91027

Out of these conventional examples, a finder optical system which is described In Japanese Patent Kokai Application No. Hei 9-329820 has a composition shown in FIG. 32.

This optical system uses a camera shake correction lens component L disposed in the optical system. This camera shake correction lens component L is decentered in parallel with an optical axis of the finder optical system by a driving system A. Blurring of rays which are incident on the optical system from an object is corrected by decentering the lens component L as described above.

Furthermore, an optical system described in Japanese Patent No. 2003-91027 has a composition shown in FIGS. 33, 34 and 35. In FIGS. 33 and 34, a lens component L of an objective lens system is moved in a direction perpendicular to an optical axis. Moreover, an eyepiece component E is moved in a direction perpendicular to an optical axis in FIG. 35. A camera shake is corrected by moving the lens components as described above.

The above described conventional techniques adopt the lens components which has functions for correcting the camera shakes, or camera shake correction lens components. When the camera shake correction lens component is decentered, imaging performance is degraded by aberrations produced due to the decentering. Furthermore, distortion produced by the eccentricity makes an image asymmetrical with regard to an optical axis.

In addition, when the camera shake correction lens component has a large weight, this lens component constitutes a heavy burden which is imposed on an actuator which is used for moving the camera shake correction lens component.

When a camera shake detecting sensitivity is low, the camera shake correction lens component is moved for a long distance. When a camera shake sensitivity is high, in contrast, it is difficult to control a movement of the camera shake correction lens component.

A camera shake correction optical system has a lot of points which must be taken into consideration for its camera shake correction function as described above.

SUMMARY OF THE INVENTION

An object of the present invention is to provide an optical system which has a simple composition and is capable of preventing image blur within a visual field through a finder from being blurred.

FIG. 1 is a schematic diagram showing a fundamental composition of an optical system according to the present invention. As shown in this drawing, the optical system according to the present invention consists of a photographing optical system PLS and a finder optical system FLS. Furthermore, disposed in an optical path of the photographing optical system PLS is optical path changing means 1 which changes an optical path from a photographing lens PL to the finder optical system FLS.

The optical system according to the present invention is characterized by comprising camera shake correcting means which is disposed in the finder optical system FLS.

Speaking concretely of the optical system shown In FIG. 1, the optical path changing means (for example, a quick return mirror) 1 is disposed in an optical path (optical axis) OA1 of the photographing optical system PLS. An optical path (optical axis) OA1 of the photographic optical system PLS to an image pickup device 2 is changed by this optical path changing means into an optical path (optical axis) OA2 to the finder optical system FLS.

The finder optical system consists of a finder lens FL and an eyepiece E. This finder optical system FLS images a primary image I1 formed by the photographing optical system PLS Into a real image (secondary image) I2 on the image side of the photographing optical system or the object side of the eyepiece E. This real image I2 is observed as a vertical image through the eyepiece E in the finder optical system FLS.

Camera shake correction means is used for correcting camera shake by moving the eyepiece in a direction perpendicular to the optical axis in the finder optical system FLS.

This camera shake correction means corrects the camera shake by moving the finder lens FL in the direction perpendicular to the optical axis in the finder optical system FLS.

FIG. 2 is a schematic diagram showing another fundamental composition of an optical system according to the present invention.

The optical system shown in this drawing is different from the optical system shown in FIG. 1 in that the former optical system uses a finder optical system FLS which Consists of a first field lens F1, a finder lens (relay lens) FL, a second field lens F2 and an eyepiece E.

The optical system shown in this drawing is configured to change an optical axis (optical path OA1) of a photographing optical system PLS Into an optical path OA2 of the finder optical system by optical path changing means 1. Disposed in the changed optical path OA2 of the finder optical system are the first field lens F1, the finder lens FL and the second field lens F2 in order from the object side. A primary image I1 formed by a photographing lens PL is imaged into a secondary image I2 by the first field lens F1, the finder lens FL and the second field lens F2. This secondary image I2 is observed through the eyepiece E.

Furthermore, an image pickup device 2 is disposed in the optical path OA1 of the photographing optical system PLS as in FIG. 1.

The optical system shown in FIG. 2 is configured to correct the camera shake by moving the finder lens (relay lens) FL in a direction perpendicular to the optical axis in the finder optical system FLS.

Furthermore, an optical system according to the present invention uses two mirrors which are optical path changing means 1 and a mirror 3 disposed in a finder optical system FLS as shown in FIGS. 1 and 2.

The optical system according to the present invention is configured to correct the camera shake by decentering or changing an inclination angle of (tilting) one of the two mirrors, for example, the mirror 3 disposed in the finder optical system FLS.

In a case where the camera shake is to be corrected by decentering or changing an inclination angle of (tilting) a mirror as camera shake correction means, the camera shake may be corrected by a third mirror which disposed in addition to a mirror 1 and a mirror 3.

In case of the above described optical system which is to correct the camera shake by decentering or changing the inclination angle of the mirror, it is possible to dispose an optical path changing mirror in the finder optical system and correct the camera shake by decentering or changing an inclination angle of one of the mirrors.

It is desirable for the optical system shown in FIG. 1 or 2 to comprise photographing optical system shake correction means which performs shake correction for an image to be observed through a finder and simultaneously performs shake correction for the photographing optical system by moving the image pickup device 2 in the direction perpendicular to the optical axis OA1.

The optical system according to the present invention which comprises the camera shake correction means in the finer optical system has a simple composition. Furthermore, the optical system according to the present invention stabilizes an image observed through the finder optical system. The optical system according to the present invention is capable in particular of correcting the camera shake which is problematic in telephotography and photography by a user unfamiliar with photographing technique. Furthermore, the optical system according to the present invention which comprises the photographing optical system shake correction means disposed directly in the image pickup device is capable of correcting the camera shake with little aggravation of aberrations.

Furthermore, an optical system according to the present invention is configured to form a secondary image by imaging an image of an object twice, allow the secondary image to be observed as a virtual image through an eyepiece and have a camera shake correction function as described above.

In other words, the optical system according to the present invention is configured to form a secondary image from a primary image which is formed by a photographing optical system and relayed by a relay optical system, and allow this secondary image to be observed as a virtual image through an eyepiece.

When the relay optical system of the optical system according to the present invention is configured to have a magnification higher than ×1, a finder magnification can be enhanced for easier observation. Furthermore, such a high magnification of the relay optical system will enhance a degree of freedom for layout of a camera shake correction optical system (vibration-proof optical system).

Furthermore, it is desirable for the optical system according to the present invention to shift (move in a plane perpendicular to the optical axis) a single lens or a plurality of lenses composing the finder optical system to correct the camera shake.

By moving the finder optical system as described above, it is possible to correct the camera shake without using an additional shake correction optical part such as a prism having a variable vertical angle. As a result, it is possible to compose an optical system which consists of a small number of parts and has a simple composition.

It is preferable for the optical system according to the present invention to compose a finder optical system in an order of a surface on which a primary image is to be formed by a photographing optical system, of a relay optical system, a surface on which a secondary image is to be formed, an eyepiece and a surface on which a virtual image is to be formed. It is also desirable for this optical system to perform the camera shake correction on the object side of the secondary image surface so that the camera shake correction has been done on the secondary imaging surface.

In other words, it is preferable for the optical system according to the present invention to comprise a relay optical system which is disposed on the image side of an image of an object (the primary imaging surface) which is to be formed by a photographing optical system. An eyepiece is to be disposed on an eye side of a secondary image to be formed by the relay optical system Furthermore, this secondary image is to be observed as a virtual image through the eyepiece. The optical system according to the present invention is to be configured to correct the camera shake before the secondary imaging surface as described above.

In a case where a visual field frame is disposed on the secondary imaging surface in the optical system configured as described above, it is necessary to dispose another camera correction means for the visual field frame when an image to be observed on the secondary imaging surface is affected by the camera shake. When the camera shake is corrected before the secondary imaging surface, in contrast, it is unnecessary to dispose camera shake correction means. In other words, it is possible to correct the camera shake for both an image to be observed and a visual field frame.

In this case, camera shake correction means may be disposed between a mirror for splitting an optical path from a photographing lens and a primary imaging surface.

The finder optical system of the optical system according to the present invention which is composed in the order of the primary imaging surface, the relay optical system, the secondary imaging surface, the eyepiece and the virtual image as described above may be configured to correct the camera shake by decentering an optical element disposed between the primary imaging surface and the secondary imaging surface.

The optical system in which the visual field frame is disposed on the secondary imaging surface requires a camera shake correction function for the visual field frame when the camera shake is not corrected on the secondary imaging surface.

When a lens element or a lens component of a relay lens system has a camera shake correction function as in the optical system according to the present invention, camera shake has been corrected on a secondary imaging surface. This optical system therefore requires no camera shake correction means for the visual field frame which is disposed on the secondary imaging surface.

It is preferable for the optical system according to the present invention to compose the relay optical system of a single field lens or a plurality of field lenses, a relay lens and a second field lens in order from a side of an object to be photographed.

In addition, the relay lens may consist of a single lens element or a plurality of lens elements.

The optical system according to the present invention which has the above described composition makes it possible to impart a pupil location adjusting function to the field lens, thereby configuring the relay optical system compact.

When the camera shake is to be corrected with the relay optical system which consists of the first field lens, the relay lens and the second field lens as described above, it is preferable to correct the camera shake with the relay lens system (the relay lens system as a whole, a lens element or lens elements when the relay lens system consists of a plurality of lens elements). The field lens has a large diameter and constitutes a heavy burden imposed on an actuator. Furthermore, it is not preferable to shift the field lens which controls a pupil location since aberrations will be remarkably aggravated by shifting the field lens.

It is preferable for the optical system according to the present invention to compose the relay optical system as described above so that the primary imaging surface on which an image is to be formed by the photographing optical system is located on the object side of the first field lens and dispose the eyepiece on the eye side of the relay optical system so that the virtual image is formed after the eyepiece.

It is desirable to configure this optical system so that the field lenses satisfy the following conditions (1) and (2):

$$|t1/f1|>2 \quad (1)$$

$$|t2/f2|>2 \quad (2)$$

wherein a reference symbol t1 represents a distance as measured from the primary imaging surface to a location of an entrance pupil, a reference symbol f1 designates a focal length of the first field lens, a reference symbol t2 denotes a distance as measured from the secondary imaging surface to a location of an exit pupil and a reference symbol f2 represents a focal length of the second field lens.

When these conditions (1) and (2) are satisfied, the first and second field lenses have roles to control locations of the entrance pupil and the exit pupils respectively, thereby making it possible to configure the relay optical system compact.

Furthermore, these conditions make it possible to configure compact the relay optical system which has a main aberration correcting role in the finder optical system of the optical system according to the present invention, thereby facilitating to dispose an aspherical surface and a diffracting surfaces on the lenses composing the relay optical system and providing effects for compact configuration of the optical system according to the present invention. Furthermore, an aspherical surface used on the first or the second field lens makes it possible to correct pupil aberrations effectively.

It is desirable for the above described composition to locate an exit pupil of the relay optical system on an observer side (a side opposite to the object side) of the secondary imaging surface.

For optimizing the relay optical system and the eyepiece optical system of the finder optical system, it is preferable to configure the relay optical system so as to have an exit pupil on the observer side of the secondary imaging surface, and such a relay optical system will make it possible to configure the finder optical system compact as a total of the relay optical system and the eyepiece optical system.

In this case, it is preferable to satisfy the following condition (3):

$$|t1/f1|>t2/f2 \quad (3)$$

Furthermore, it is desirable that the first and second field lenses satisfy the following conditions (4) and (5) respectively:

$$s1/f1 \geq 0.1 \quad (4)$$

$$s2/f2 \geq 0.1 \quad (5)$$

wherein a reference symbol s1 represents a distance as measured from the primary imaging surface to the first field lens and a reference symbol s2 designates a distance as measured from the secondary imaging surface to the second field lens.

A focusing screen, a visual field frame and the like are disposed on the primary imaging surface and the second imaging surface in the finder optical system.

When the optical system according to the present invention is configured so as to satisfy the above-mentioned conditions (4) and (5), the optical system is capable of preventing observation of foreign matters adhering to the focusing screen, the visual field frame and the like.

It is preferable for the optical system according to the present invention to correct the camera shake by shifting a lens element or a lens component which has an effective diameter not longer than 70% of a maximum effective diameter of the optical system in a direction perpendicular to the optical axis.

This means is capable of lessening a burden on an actuator which is used for shifting a camera shake correction lens element or lens component.

Furthermore, it is desirable to correct the camera shake by shifting an optical system having a pupil in the finder optical system.

Effective diameter is small in the vicinity of an optical system. A burden on an actuator is lessened when camera shake is corrected by shifting a lens element or a lens component disposed in the vicinity of an actual pupil.

It is desirable for the optical system according to the present invention to correct the camera shake by shifting a lens component comprising a lens element or a lens component (shifting lens component) disposed before or after an actual pupil.

It is preferable to select a lens component comprising a lens element disposed before or after an actual pupil as a shifting lens component since aberrations are aggravated little by shifting the lens component for camera shake correction.

This effect is more remarkable in particular when the relay optical system consists of the first field lens, the relay lens and the second field lens in the order from the side of the object to be photographed.

It is preferable for the optical system according to the present invention to correct the camera shake by shifting the eyepiece.

An eyepiece optical system of an observation optical system has a simple composition since it is sufficient for the eyepiece optical system to have a function to form a virtual image. By configuring an eyepiece of this eyepiece optical system so as to have a camera shake correction function, it is possible to reduce aggravation of aberrations and lessen a weight of a shake correction lens component.

It is desirable for the optical system according to the present invention to select a composition comprising a positive lens element and a negative lens element for a single lens or a plurality of lenses composing the relay optical system.

Chromatic aberration can be corrected by selecting the above described composition for the relay lens component. Chromatic aberration is aggravated little when the camera shake is corrected by shifting the relay lens component.

In this case, it is preferable to select a triplet composition comprising positive, negative and positive lens elements for the relay lens component in the relay optical system since aberrations can be corrected favorably with such a simple composition.

The optical system according to the present invention satisfies the following condition (6):

$$0.3\Delta \leq T \leq 3\Delta \quad (6)$$

wherein a reference symbol T represents a shift amount for the camera shake correction and a reference symbol $\Delta$ designates a shake amount of the primary image.

The condition (6) is required for obtaining an adequate shake correction sensitivity. If the shift amount T is higher than an upper limit of $3\Delta$ of the condition (6), a sensitivity will be too high, thereby making it difficult to delicately control a shift amount of the shake correction lens component. If the sift amount T is smaller than a lower limit of 0.3Δ, in contrast, a sensitivity will be too low, thereby enlarging the sift amount for the shake correction and increasing a burden on the actuator.

The relay optical system of the optical system according to the present invention may comprise a prism for deflecting an optical path in a finder, in this case, it is desirable to configure a surface of incidence of the prism as the first field lens. Similarly, a surface of emergence of the prism may be configured as the second field lens.

It is considered, for example, to dispose an optical path deflecting prism immediately after the primary image and configure a surface of the prism on a side of the primary image as a convex surface so as to have a role of the first field lens, dispose an optical path deflecting prism which has a surface of emergence immediately before the secondary image and configure the surface of emergence as a convex surface so as to have a role of the second field lens or dispose both the prisms.

It is desirable for the optical system according to the present invention to configure the relay optical system so as to have a magnification β satisfying the following condition (7):

$$1.1 \leq \beta \leq 2 \quad (7)$$

Now, description will be made of the optical system according to the present invention which has the second composition comprising the optical path splitting means for changing or splitting the optical path of the photographing optical system into the optical path to the finder optical system, configured to allow observation of the rays from the object to be photographed through the finder optical system after the rays are reflected at least twice by the optical path splitting means and using the camera shake correction means in the finder optical system.

This optical system according to the present invention has a fundamental composition similar to that of the optical system already described above, but is characterized in that at least two reflecting means are disposed in the finder optical system and a camera shake correction mechanism correct camera shake by decentering or changing an inclination angle of one of the means.

The optical system according to the present invention which has the second composition can be simplified since the photographing optical system has a function of an objective lens of the finder optical system. Furthermore, since the finder optical system has a camera shake correction function, the finder optical system can stabilize an image to be observed and correct the camera shake which is problematic in particular at a telephotographing time by a user unfamiliar with photographing technique. In this case where the optical system comprises at least two reflecting mirrors including the optical path splitting means and is capable of correcting the camera shake with one of the reflecting mirrors, the optical system provides a merit to enhance a degree of freedom for a layout for the camera shake correction.

Furthermore, it is desirable for the optical system according to the present invention which has the second composition to correct the camera shake by decentering the reflecting mirror disposed in the finder optical system.

A method for correcting the camera shake with this reflecting mirror is classified into two: one for correcting the camera shake by tilting or changing an inclination angle of the reflecting mirror and the other for correcting the camera shake by moving the mirror on a plane perpendicular to the optical axis.

Since the optical system according to the present invention which uses the reflecting mirror is capable of correcting the camera shake by the above described method without disposing a new element such as a prism having a variable vertical angle, a composition of the optical system can be simplified.

Furthermore, since a variation amount of a ray reflected by the mirror is twice (2Δα) as large as a variation amount (Δα) of the inclination angle of the reflecting mirror caused for the correction of the camera shake, the change of the inclination angle providers a correction effect higher than that obtained by decentering an ordinary lens.

Furthermore, the finder optical system used in the optical system according to the present invention which has the composition consisting of the primary imaging surface, the relay optical system, the secondary imaging surface, the eyepiece and the virtual image in the order from the object side, has the camera shake correction function before the secondary imaging surface.

In other words, it is preferable to configure the optical system according to the present invention which has the second composition so as to have a composition in which a relay optical system and an eyepiece are disposed in order after a primary imaging surface form a secondary image between the relay optical system and the eyepiece by the relay optical system, and allow this secondary image to be observed as a virtual image through the eyepiece.

In a case where a visual field frame is disposed on the secondary imaging surface in the optical system which has the above described composition and the camera shake is not corrected on the secondary imaging surface, the optical system will require another function to correct a visual field frame shake. When the camera shake is corrected on the secondary imaging surface, however, the camera shake can be corrected for both the image to be observed and the visual field frame without disposing another shake correction function.

In a case where camera shake is corrected with a mirror as in the optical system according to the present invention, a mirror for splitting an optical path from a photographing lens to a finder (the optical path changing means 1 in FIG. 1 or 2) may be used as a camera shake correction mirror. Furthermore, camera shake may be corrected between a mirror for splitting an optical path from a photographing lens and a primary imaging surface. For example, a reflecting mirror which is to be used for deflecting an optical path or the like purpose (a mirror 3 in FIG. 1 or 2) may be disposed between an optical path slipping mirror and a primary imaging surface, and used for camera shake correction.

For a finder optical system which consists of a relay optical system and an eyepiece in order from a primary imaging surface as described above, and is configured to locate a secondary imaging surface between the relay optical system and the eyepiece and form a virtual image on the eye side of the eyepiece, it is possible to dispose a reflecting surface between the primary imaging surface and the secondary imaging surface, and correct camera shake by decentering this reflecting surface.

In a case where the visual field frame is disposed on the secondary imaging surface in the optical system which has the above described composition and the camera shake is not corrected on the secondary imaging surface, the optical system requires the other visual field frame shake correction function as described above. In this case, the camera shake may be corrected by decentering an optical element which is disposed between the primary imaging surface and the secondary imaging surface. Since the camera shake has been corrected on the secondary imaging surface, the optical element can correct the camera shake for both the image to be observed and the visual field frame without a shake correction function for the visual field frame.

Furthermore, the mirror which is disposed between the primary imaging surface and the secondary imaging surface for the camera shake correction is preferable since this mirror can have a diameter small than that of another mirror which is disposed at another location and facilitate to drive the mirror for the camera shake correction.

In this case, the camera shake may be corrected using the mirror for splitting the optical path from the photographing lens. Furthermore, the camera shake may be corrected between the mirror for splitting the optical path from the photographing lens and the primary imaging surface.

It is preferable that a relay optical system to be used in the optical system according to the present invention is composed of a first field lens, a relay lens and a second field lens in order from the side of the object to be photographed as shown in FIG. 2.

When a composition such as that described above is selected for the relay lens system, the first and second field lenses can have pupil location control roles. The composition is preferable since the composition makes it possible to configure the relay optical system compact. As a result, composition makes it possible to use a mirror which has a smaller size.

Furthermore, when the finder optical system is composed in an order of the primary imaging surface, the first field lens, the relay lens, the second field lens, the secondary image to be formed by the relay optical system, the eyepiece and the virtual image to be formed by the eyepiece lens, it is possible to dispose a mirror between the first field lens and the relay lens, and correct camera shake by changing an inclination angle of (tilting), this mirror.

In this case, a diameter of a light bundle is reduced by the first field lens. Accordingly it is possible to dispose a mirror which has a small diameter between the first field lens and the relay lens. Furthermore, a separate camera shake correction means is necessary when a visual field frame is to be disposed on the secondary imaging surface and camera shake is not corrected on the secondary imaging surface. When a reflection mirror is disposed between the first field lens and the relay lens to correct the camera shake with the reflecting mirror, the camera shake is corrected on the secondary imaging surface, thereby making is possible to correct the camera shake for both the image to be observed and the visual field frame without correcting the camera shake separately for the visual field frame.

The relay lens of the relay optical system is composed of at least a lens element or a lens component also in the optical system which has the above described second composition.

For the optical system according to the present invention in which the relay optical system consists of the first field lens, the relay lens and the second field lens, it is preferable that the first and second field lenses of the relay optical system satisfy the above-mentioned conditions (1) and (2).

Furthermore, for the optical system according to the present invention which has the second composition, it is preferable that an exit pupil of the relay lens is formed on the eye side of the secondary imaging surface.

It is necessary to optimize the finder optical system as a total optical system of the relay optical system and the eyepiece optical system. When the exit pupil of the relay optical system is formed on the eye side of the secondary imaging surface, it is possible to configure compact the optical system as the total of the relay optical system and the eyepiece optical system.

In this case, it is preferable for compact configuration of the optical system to satisfy the above-mentioned condition (3).

Furthermore, it is more preferable to configure the field lenses so as to satisfy the above-mentioned conditions (4) and (5).

It is desirable for of finder optical system of the optical system according to the present invention that the finder optical system has the relay optical system, the secondary imaging surface, the eyepiece and the virtual image are disposed on the eye side of the primary imaging surface, that the reflecting mirror is disposed between the secondary imaging surface and the eyepiece, and that the camera shake is corrected by changing a reflection angle of this reflecting mirror.

In a case where camera shake is to be corrected by tilting a reflecting surface in the optical system according to the present invention which has the second composition, it is desirable that an angle change $\Delta\alpha$ of a mirror is not smaller than 0.4° and not larger than 5°. In other words, it is desirable that the angle change $\Delta\alpha$ satisfied the following condition (8):

$$0.4° < \Delta\alpha < 5° \quad (8)$$

When this condition (8) is satisfied, a camera shake sensitivity (correction amount of image blur due to the camera shake/change amount of camera shake correction lens component) is adequate. If $\Delta\alpha$ a is smaller than a lower limit of 0.4° of the condition (8), the camera shake sensitivity will be too high, thereby making it difficult to delicately control an angle of the mirror. If $\Delta\alpha$ is larger than an upper limit of the condition (8), the camera correction sensitivity will be too low, thereby enlarging the angle change amount of the mirror and constituting a heavy burden on the actuator.

It is preferable also for the optical system according to the present invention which has the second composition that the magnification $\beta$ of the relay optical system satisfies the above-mentioned condition (7).

DETAILED DESCRIPTION OF THE PREFERRED EMBODIMENTS

Figure 1:
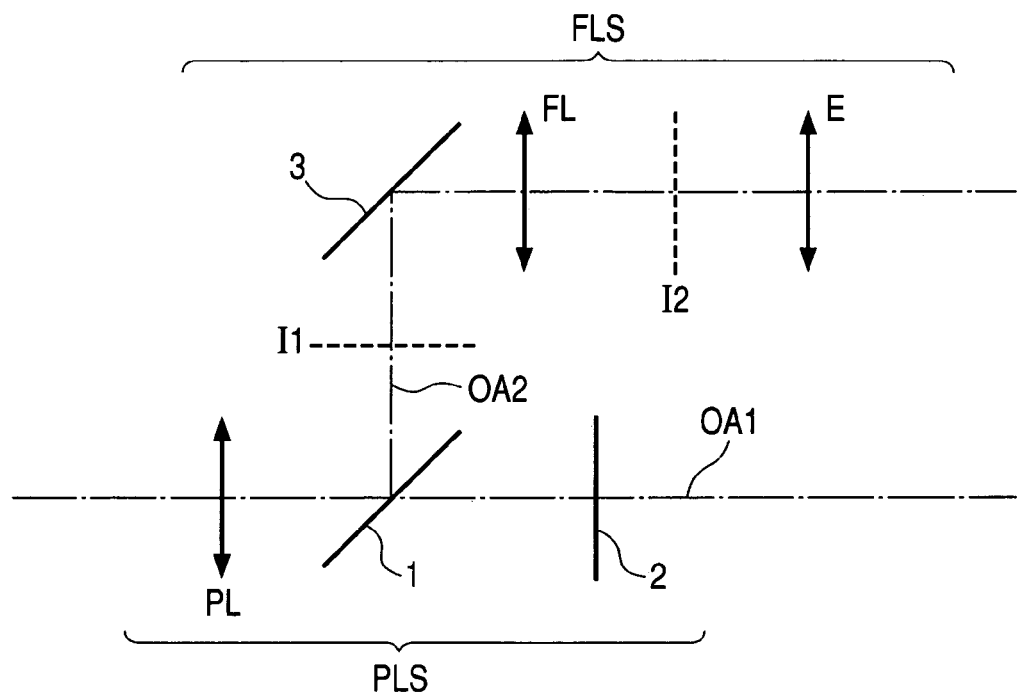
FIGS. 1 and 2 are diagram showing outlines of fundamental compositions of optical systems according to the present invention.
Figure 2:
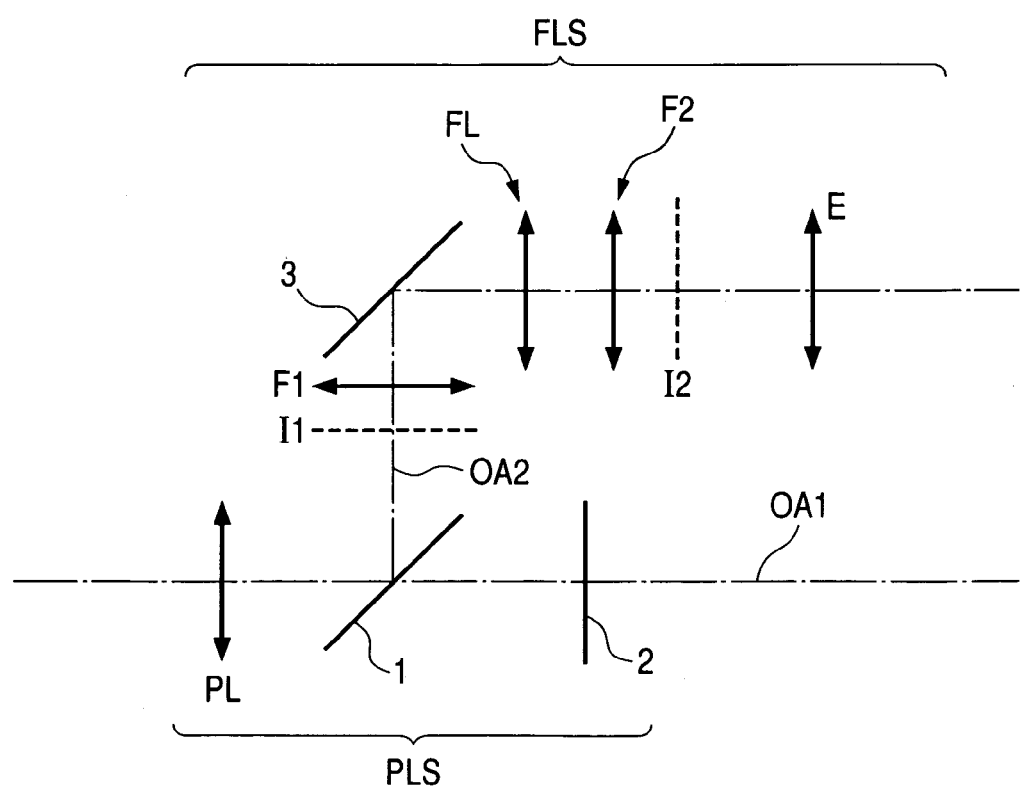

Now, description will be made of embodiment of the optical systems according to the present invention.

A first embodiment of the optical system according to the present invention has a composition illustrated in FIG. 3 and numerical data listed below:

| | | | |
|---|---|---|---|
| $r_0 = \infty$ | $d_0 = -0.06$ | | |
| $r_1 = \infty$ | $d_1 = 3.14$ | | |
| $r_2 =$ aspherical surface 1 | $d_2 = 3.70$ | $n_1 = 1.4924$ | $v_1 = 57.7$ |
| $r_3 = -19.66$ | $d_3 = 10.68$ | | |
| $r_4 = 7.06$ | $d_4 = 3.75$ | $n_2 = 1.6968$ | $v_2 = 55.5$ |
| $r_5 = -16.18$ | $d_5 = 1.80$ | | |
| $r_6 = -4.11$ | $d_6 = 0.90$ | $n_3 = 1.6727$ | $v_3 = 32.1$ |
| $r_7 = 10.55$ | $d_7 = 0.75$ | | |
| $r_8 = 27.89$ | $d_8 = 4.86$ | $n_4 = 1.6968$ | $v_4 = 55.5$ |
| $r_9 = -7.33$ | $d_9 = 11.05$ | | |
| $r_{10} =$ aspherical surface 2 | $d_{10} = 4.96$ | $n_5 = 1.5254$ | $v_5 = 55.8$ |
| $r_{11} = -79.46$ | $d_{11} = 8.15$ | | |
| $r_{12} = \infty$ | $d_{12} = 25.00$ | | |
| $r_{13} =$ aspherical surface 3 | $d_{13} = 3.70$ | $n_6 = 1.4924$ | $v_6 = 57.7$ |
| $r_{14} = -44.85$ | $d_{14} = 3.25$ | | |
| $r_{15} = \infty$ | $d_{15} = 1.00$ | $n_7 = 1.5163$ | $v_7 = 64.1$ |
| $r_{16} = \infty$ | $d_{16} = 11.09$ | | |
| $r_{17} =$ stop surface | $d_{17} = -904.55$ | | |
| $r_{18} = \infty$ | $d_{18} = 0.00$ | | | aspherical surface 1 radius of curvature 10.11
k = 0
A = −6.7217 × 10⁻⁴, B = 4.8326 × 10⁻⁶, C = −3.7491 × 10⁻⁸
aspherical surface 2 radius of curvature 11.84
k = 0
A = −1.5339 × 10⁻⁴, B = 1.5158 × 10⁻⁶, C = −1.3577 × 10⁻⁸
Aspherical surface 3

Radius of curvature 17.89
k = 0
A = −3.7860 × 10⁻⁵, B = 5.2082 × 10⁻⁷, C = −5.8476 × 10⁻⁹

In the numerical data listed above, reference symbols $r_0$, $r_1$, $r_2$ . . . represent radii of curvature on lens surfaces, reference symbols $d_1$, $d_2$ . . . designate distances between lens surfaces, reference symbols $n_1$, $n_2$ . . . denote refractive indices of respective lenses for the d line, and reference symbols $v_1$, $v_2$ . . . represent Abbe's numbers. In addition, $r_0$ represents an object surface, $r_1$ designates a primary imaging surface, $r_{12}$ denotes a secondary imaging surface and a unit for all lengths such as r and d is millimeter.

Figure 3:
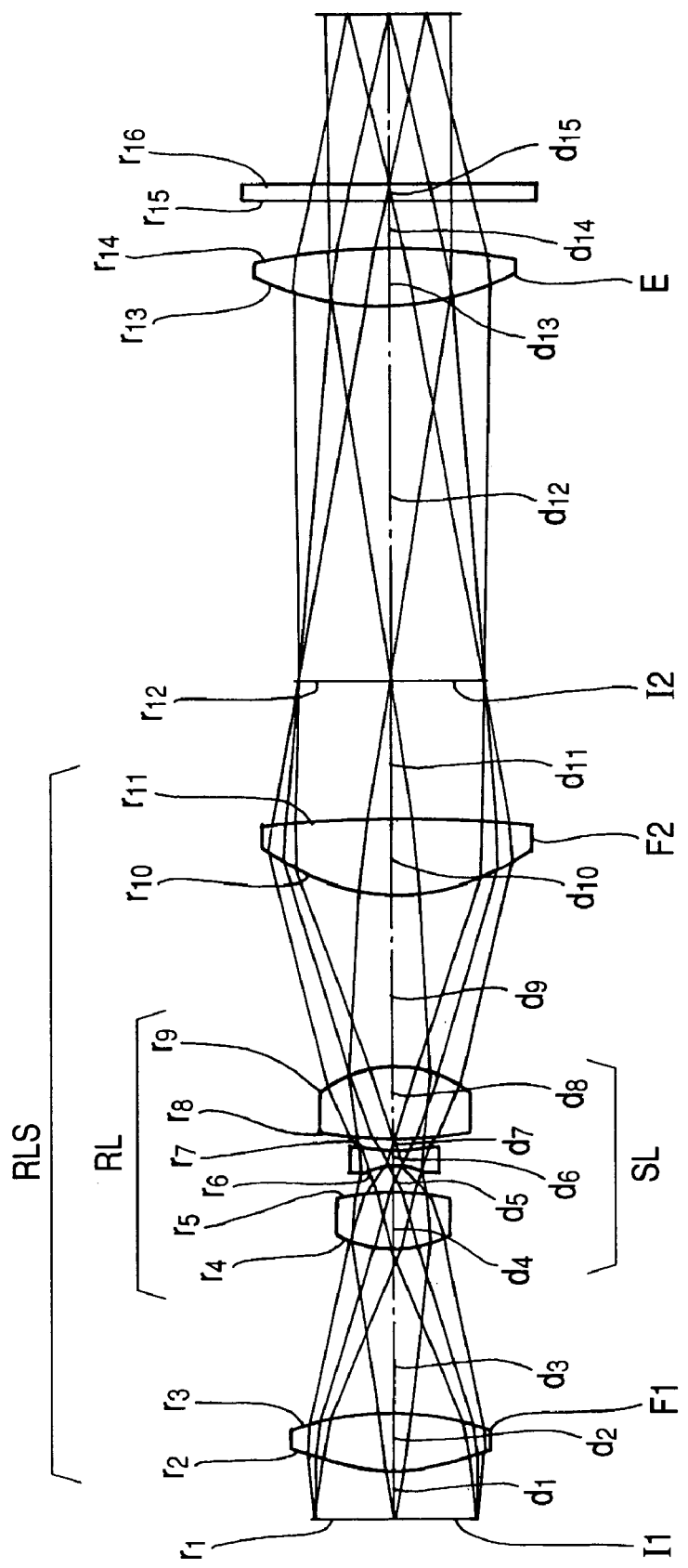
FIG. 3 is a sectional view showing a composition of first and second embodiments of the present invention.
Figure 4:
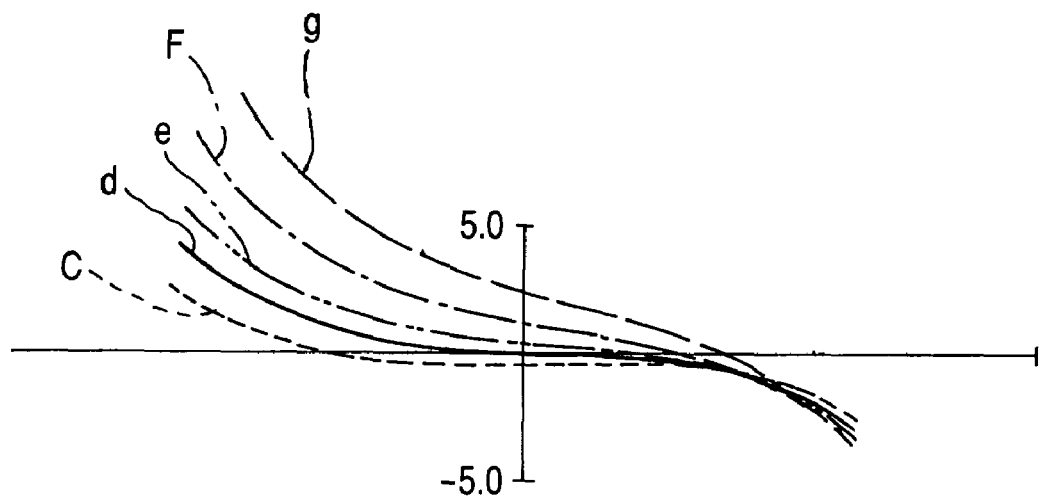
FIG. 4 is a diagram showing aberrations in the first embodiment of the present invention at an image height of −1.00.
Figure 4:
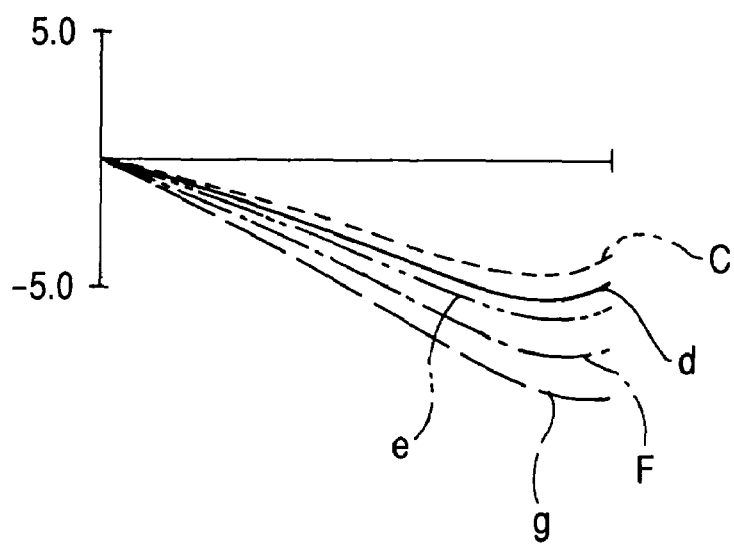
Figure 5:
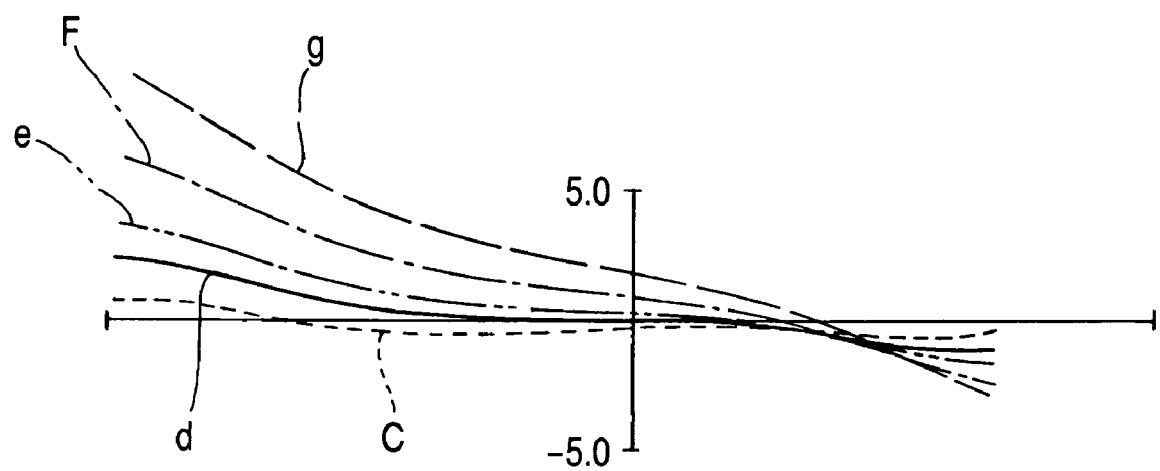
FIG. 5 is a diagram showing aberrations in the first embodiment of the present invention at an image height of −0.8.
Figure 5:
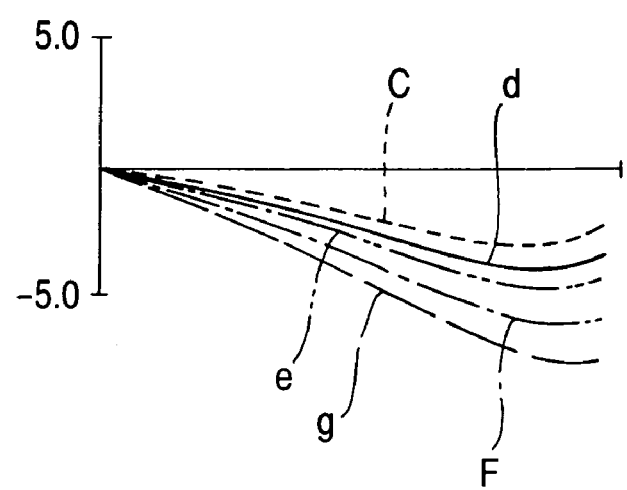
Figure 6:
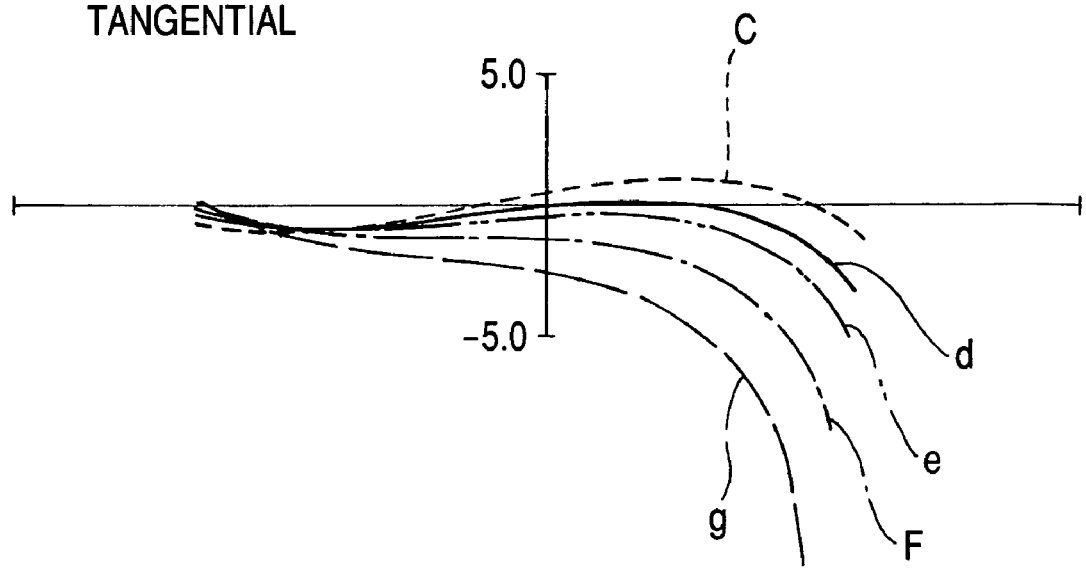
FIG. 6 is a diagram showing aberrations in the first embodiment of the present invention at an image height of 1.00.
Figure 6:
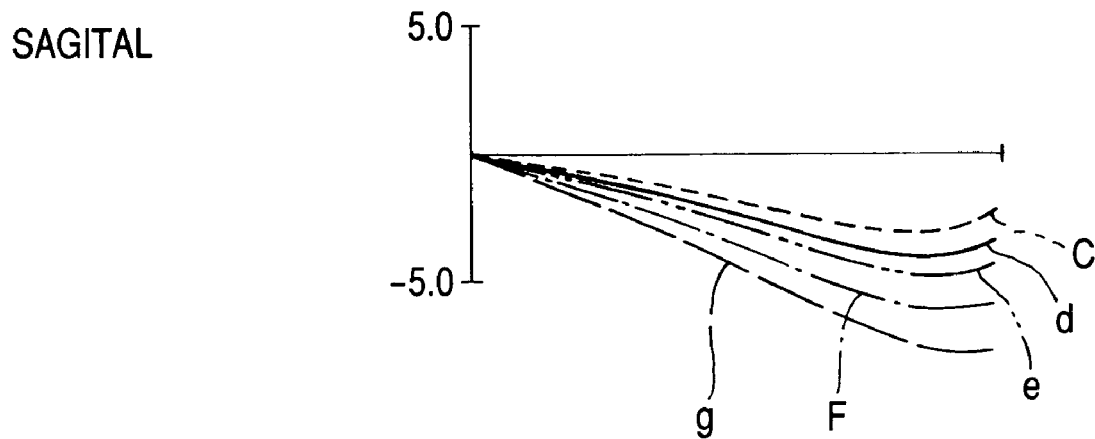
Figure 7:
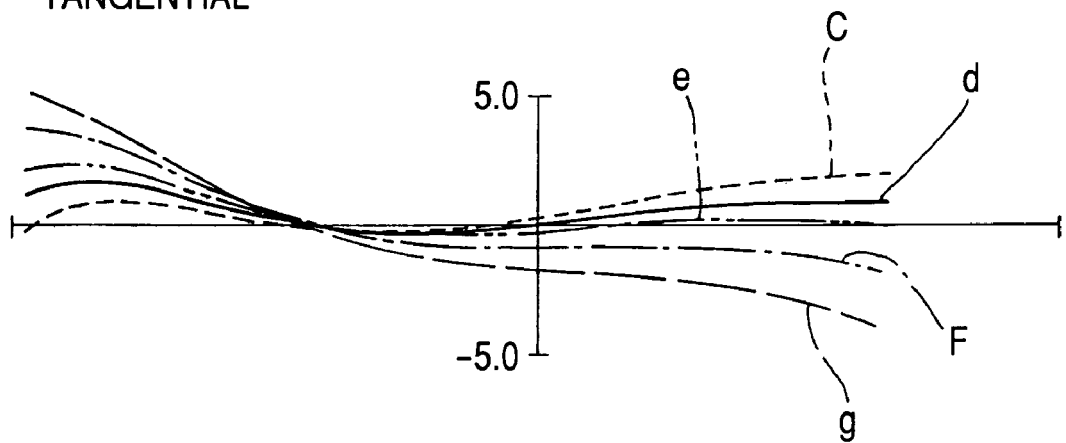
FIG. 7 is a diagram showing aberrations in the first embodiment of the present invention at an image height of 0.80.
Figure 7:
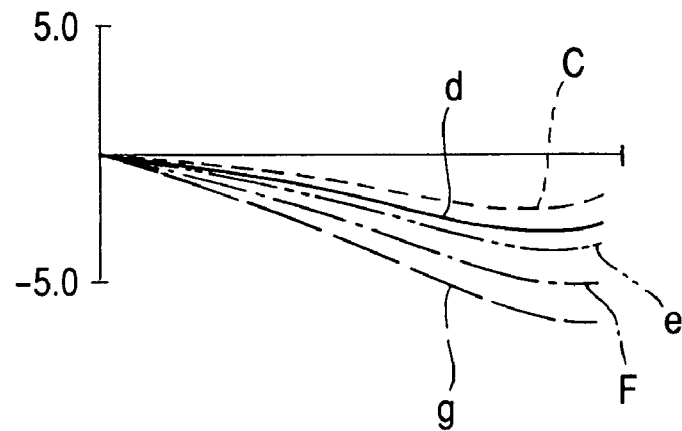
Figure 8:
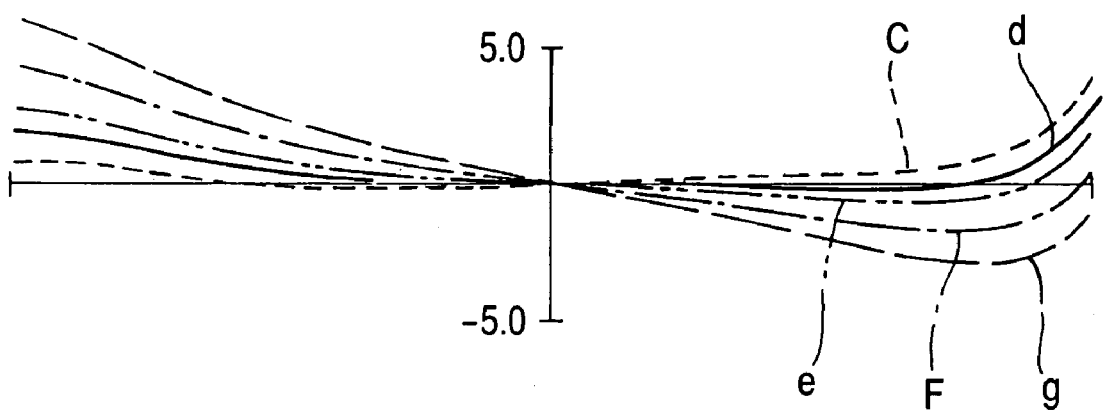
FIG. 8 is a diagram showing aberrations in the first embodiment of the present invention at an image height of 0.00.
Figure 8:
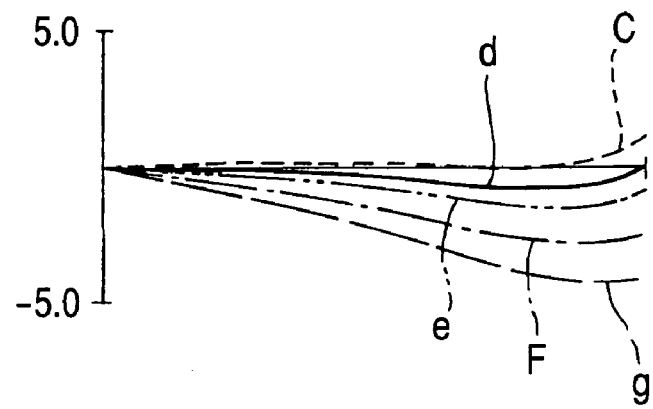
Figure 9:
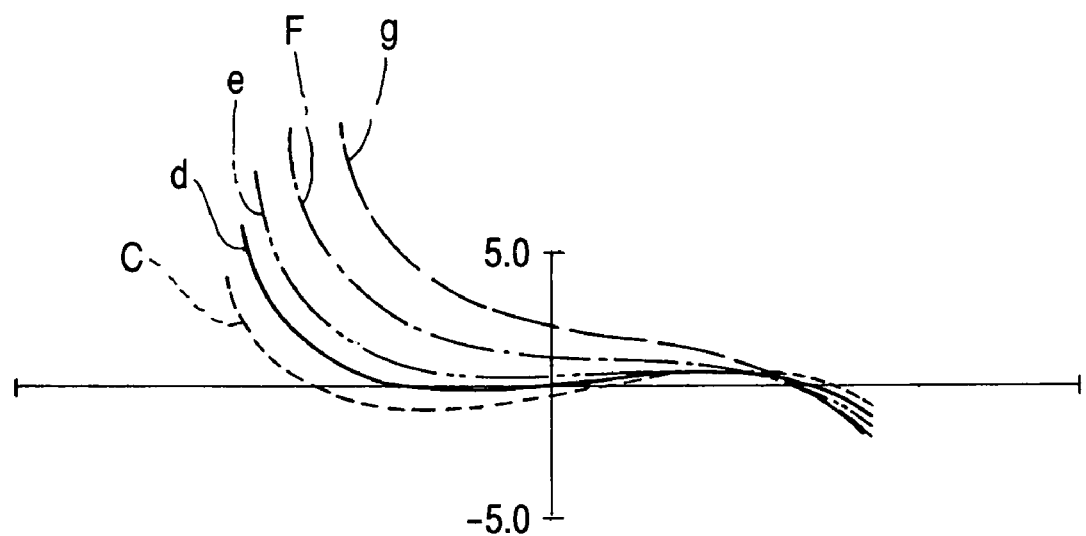
FIG. 9 is a diagram showing aberrations of the second embodiment of the present invention at the image height of −1.00.
Figure 9:
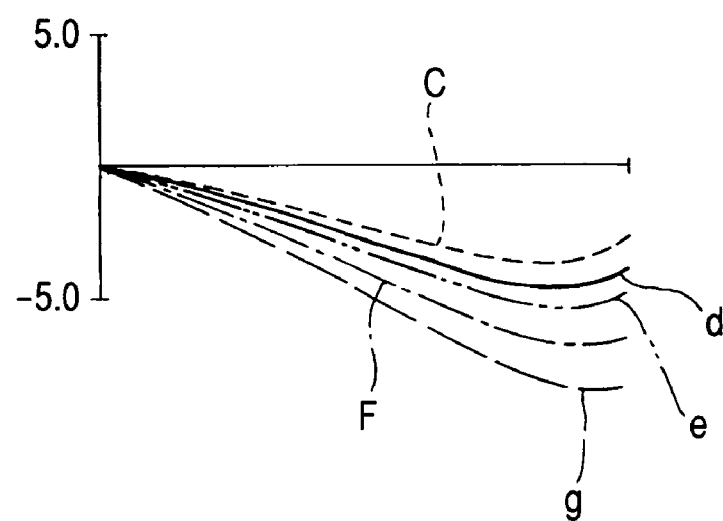
Figure 10:
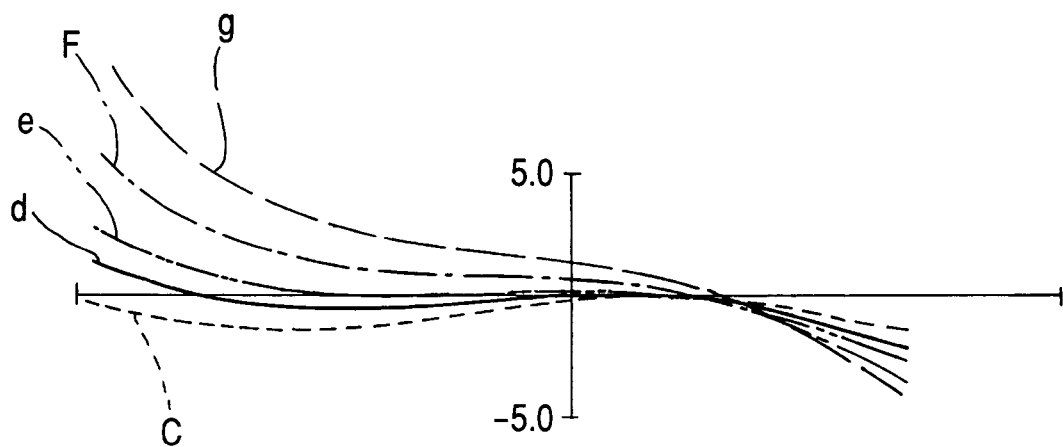
FIG. 10 is a diagram showing aberrations in the second embodiment of the present invention an the image height of −0.80.
Figure 10:
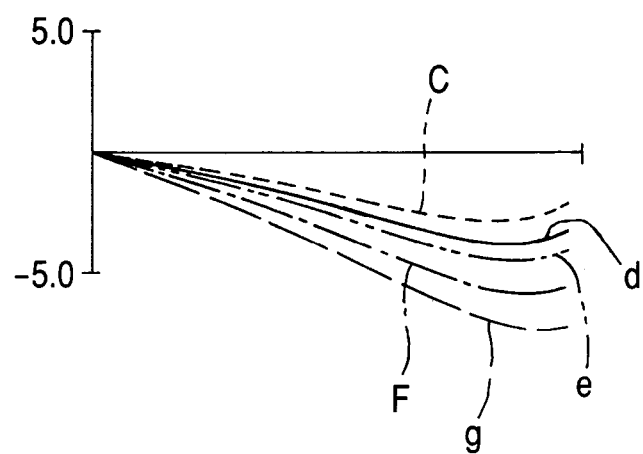
Figure 11:
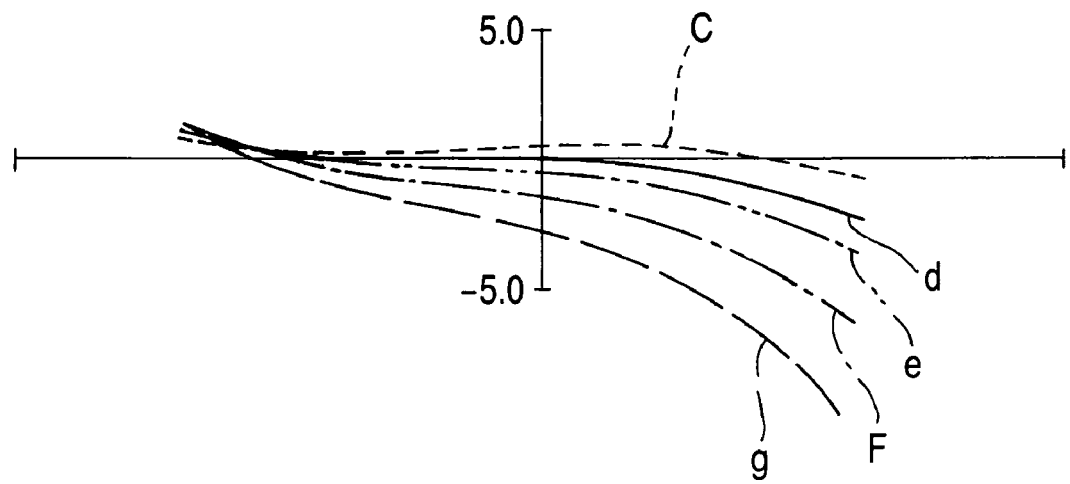
FIG. 11 is a diagram showing aberrations in the second embodiment of the present invention at the image height of 1.00.
Figure 11:
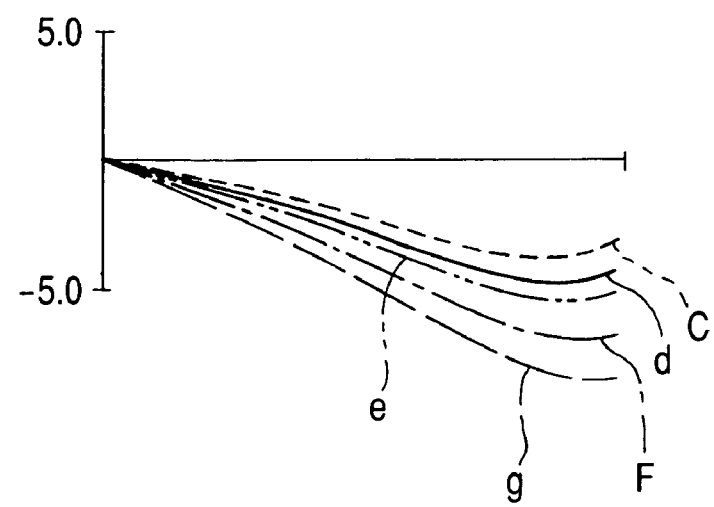
Figure 12:
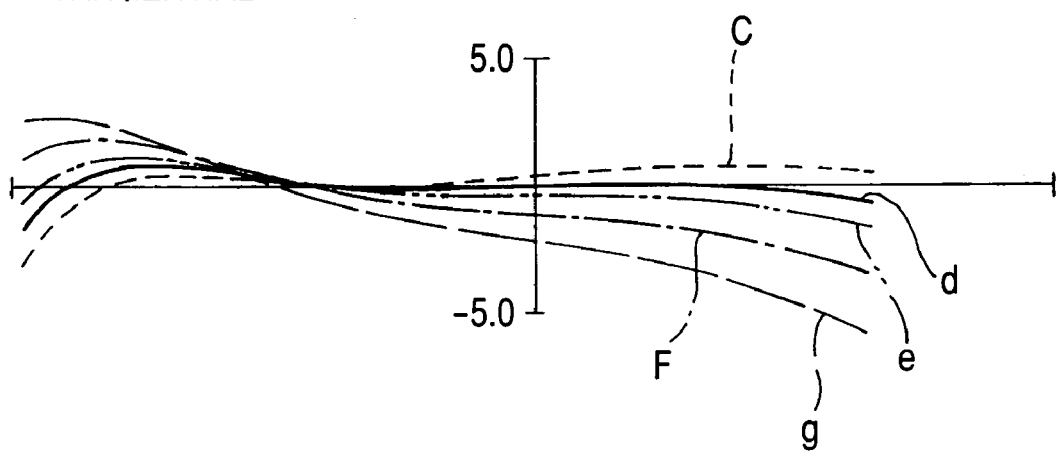
FIG. 12 is a diagram showing aberrations of the second embodiment of the present invention at the image height of 0.80.
Figure 12:
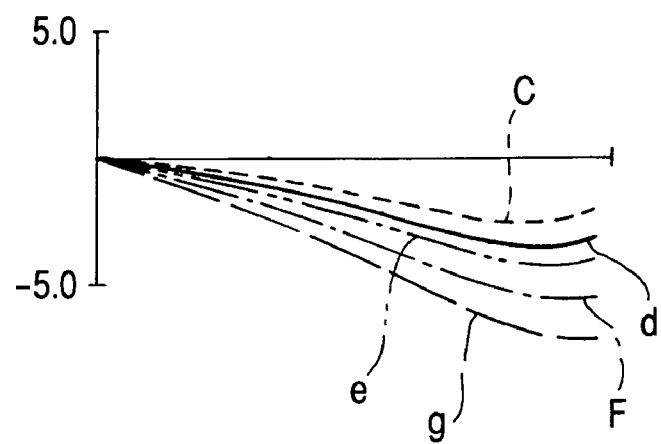
Figure 13:
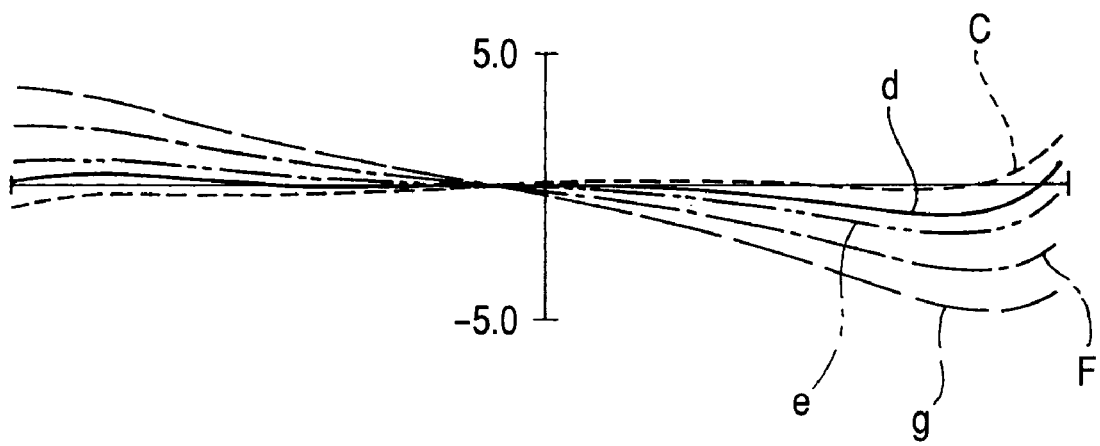
FIG. 13 is a diagram showing aberrations of the second embodiment of the present invention at the image height of 0.00.
Figure 13:
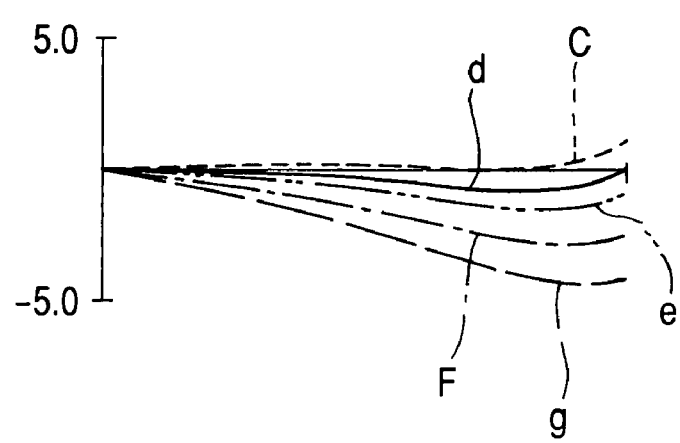
Figure 14:
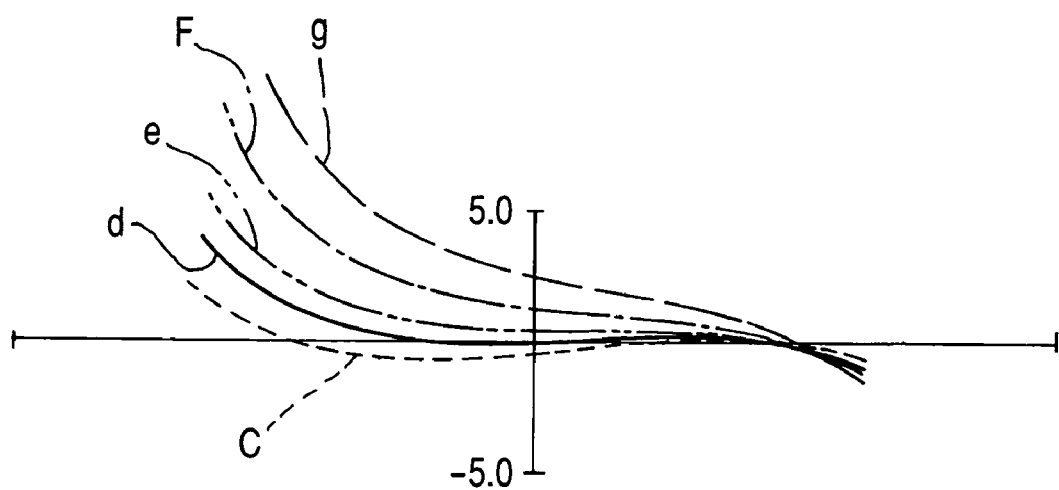
FIG. 14 is a diagram showing lateral aberrations in a standard optical system (free from camera shake) of the optical system according to the present invention at the image height of −1.00.
Figure 14:
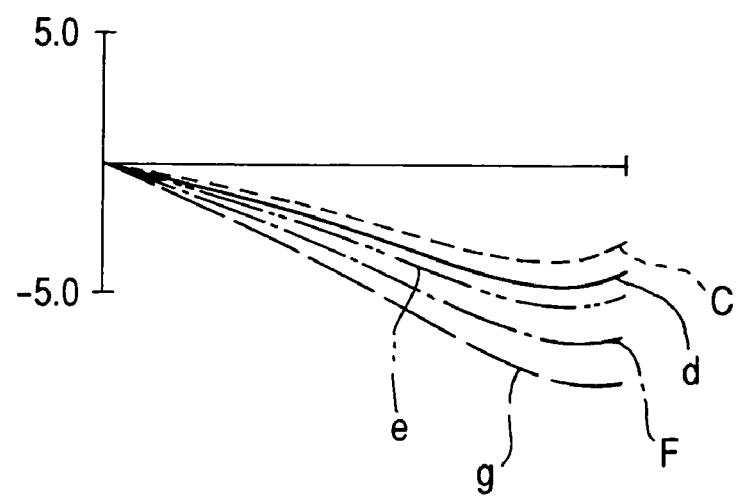
Figure 15:
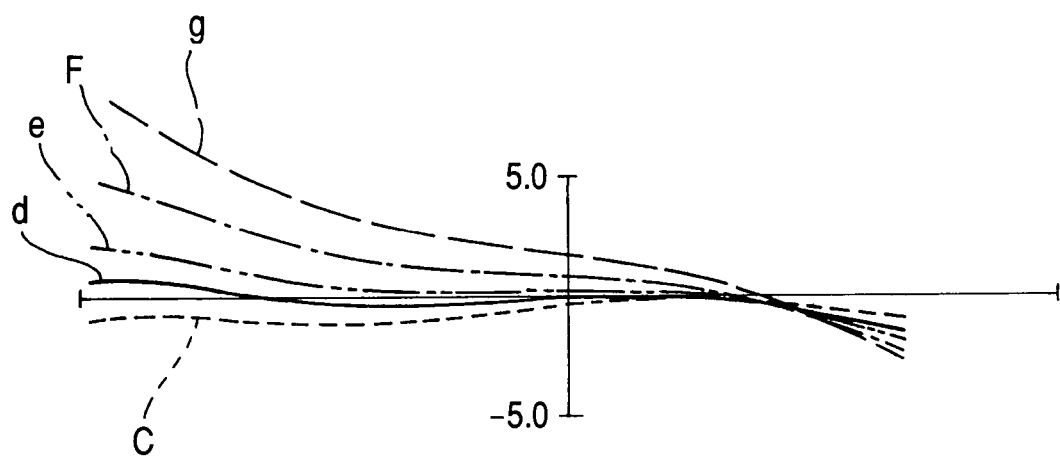
FIG. 15 is a diagram showing lateral aberrations in the standard optical system (free from the camera shake) of the optical system according to the present invention at the image height of −0.80.
Figure 15:
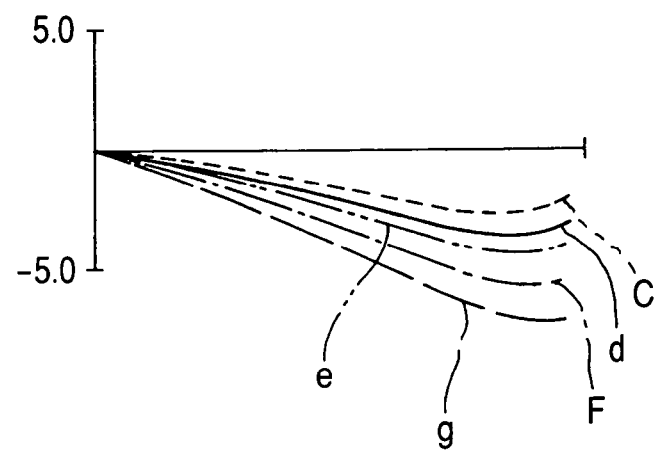
Figure 16:
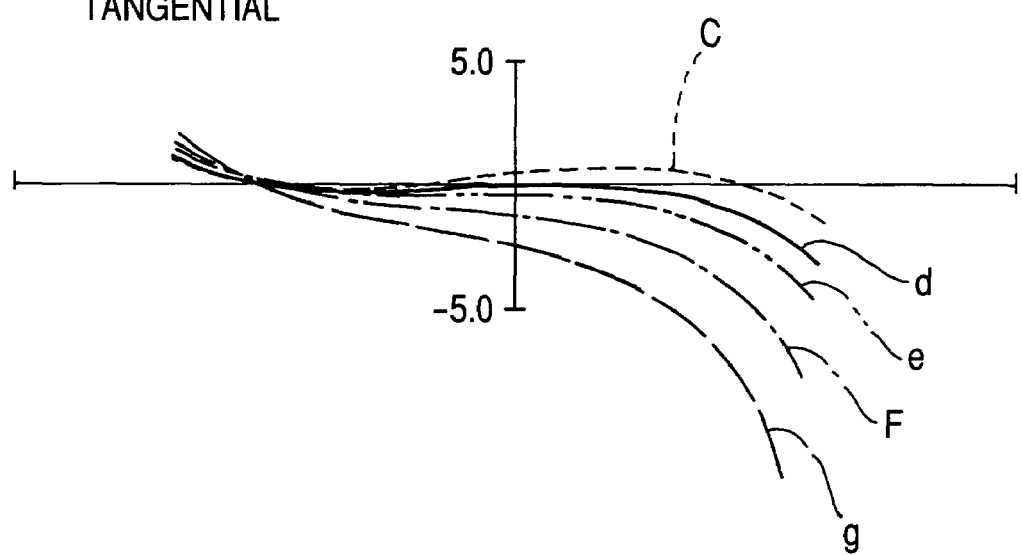
FIG. 16 is a diagram showing lateral aberrations in the standard optical system (free from the camera shake) of the optical system according to the present invention at the image height of 1.00.
Figure 16:
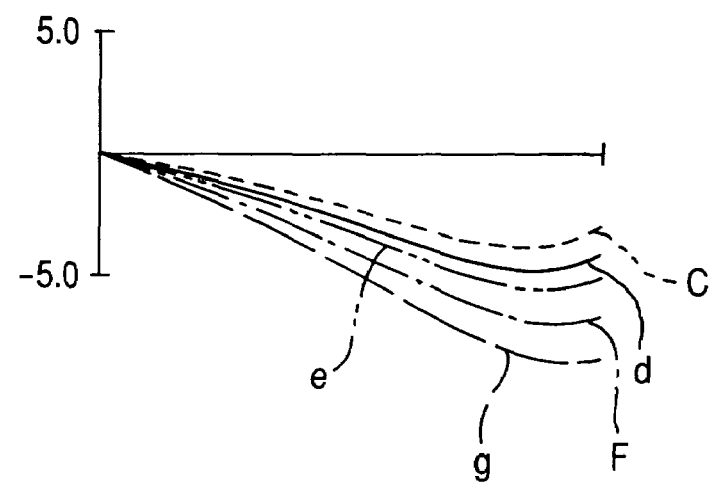
Figure 17:
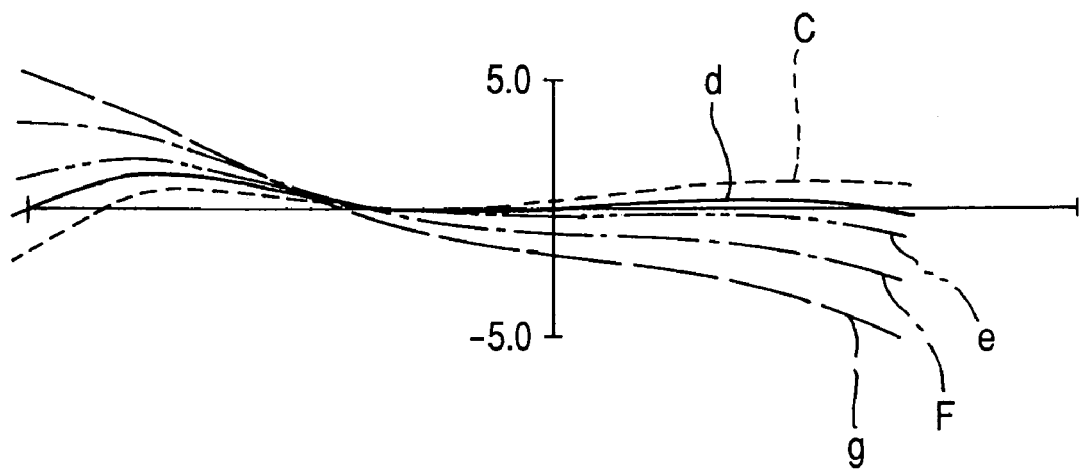
FIG. 17 is a diagram showing lateral aberrations in the standard optical system (free from the camera shake) of the optical systems according to the present invention at the image height of 0.80.
Figure 17:
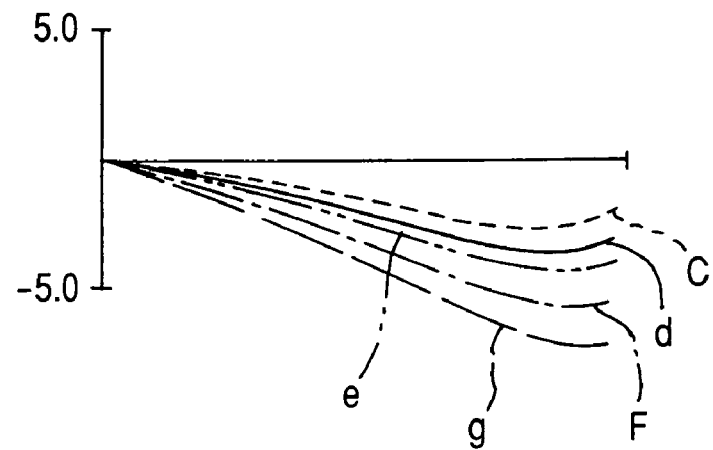
Figure 18:
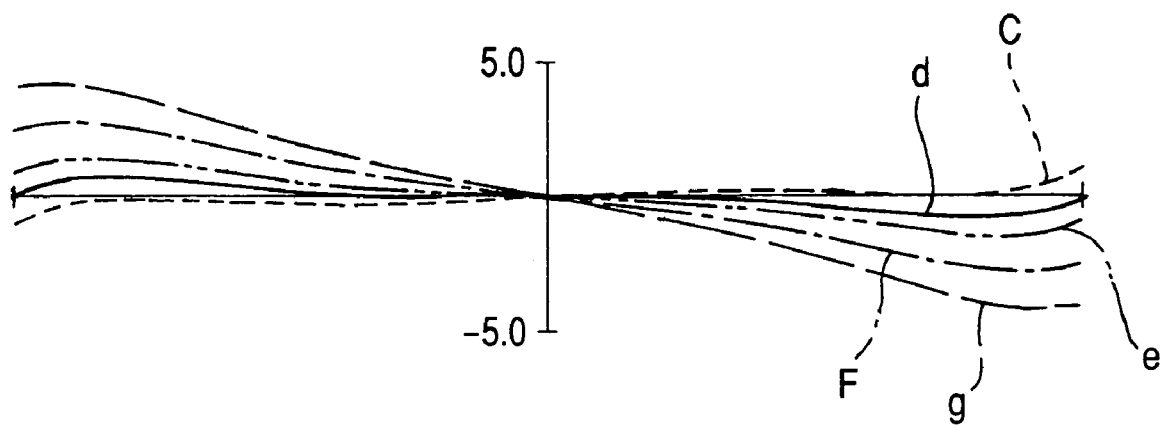
FIG. 18 is a diagram showing lateral aberrations in the standard optical system (free from the camera shake) of the optical system according to the present invention at the image height of 0.00.
Figure 18:
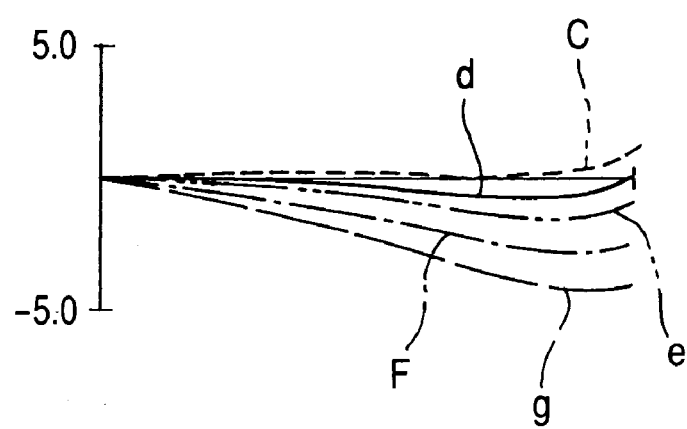

An optical system according to the first embodiment consists, as shown in FIG. 3 of a relay optical system RLS which is composed of a first field lens F1 ($r_2$ through $r_3$), a relay lens system RL ($r_4$ to $r_9$) and a second field lens F2 ($r_{10}$ to $r_{11}$) disposed from a side of an imaging location (primary imaging surface) of a photographing optical system to an observer side, and a eyepiece optical system E ($r_{13}$ to $r_{14}$).

The optical system according to the first embodiment is configured to correct camera shake by shifting a lens component SL (shifting lens component) of the relay lens system RL.

The first embodiment is capable of correcting the camera shake by shifting the lens component (shifting lens component SL) for a distance of 0.27 mm in a direction perpendicular to an optical axis when a primary image is shifted 0.3 mm on the primary imaging surface.

Though the sifting lens component SL is made of glass in the first embodiment, the lens component has a small diameter and constitutes a burden which is not so heavy on a driving mechanism for shifting the lens component.

Furthermore, though the shifting lens component has spherical surfaces only, it is possible to prevent aberrations from being aggravated by using an aspherical surface on this lens component.

The first embodiment which is configured to correct the camera shake by shifting the relay lens system RL corrects the camera shake on the object side of secondary imaging surface I2 ($r_{12}$).

Accordingly, the first embodiment in which the camera shake has been corrected at a location of the second field lens F2 is preferable since this embodiment requires no separate mechanism for preventing a variation of an image of a visual field stop caused due to the camera shake when the second embodiment adopts a composition in which a visual field stop is disposed, for example, in the vicinity of the second field lens F2.

Aberration conditions shown in FIGS. 4, 5, 6, 7 and 8 are obtained as a result of the correction of the camera shake which is effected by shifting the relay lens system in the optical system according to the first embodiment. In a condition free from the camera shake, or in a condition where the lens component SI stays on the optical axis, on the other hand, aberrations were as shown in FIGS. 14, 15, 16, 17 and 18.

The above described aberrations are lateral aberrations at image heights of −1.00, −0.80, 1.00, 0.80 and 0.00 taking a maximum image height at a location of a virtual image as 1.00.

As apparent from the diagrams showing these aberrations, it will be understood that the optical system according to the first embodiment corrects an image location by correcting the camera shake and maintains aberrations substantially the same as these in a condition free from the camera shake.

For the optical system according to the present invention, the values defined by the above mentioned conditions (1) through (7) are as listed below:

$t1/f1=14.9$ $t2/f2=3.59$ $|t1/f1|>|t2/f2|$ $s1/f1=3.2/14.1=0.23$ $s2/f2=8.15/20=0.41$ $T=0.27$ $\Delta=0.3$ $0.3\Delta=0.09$ $3\Delta=0.9$ $\beta=1.19$ The first embodiment satisfies all the conditions (1) through (7) as apparent from the values listed above.

Furthermore, the first embodiment uses rotationally asymmetrical aspherical surfaces as an object side surface ($r_2$) of the first field lens F1, an object side surface ($r_{10}$) of the second field lens F2 and an object side surface ($r_{13}$) of the eyepiece E as defined in the numerical data.

These aspherical surfaces are expressed by the following formula:

$$z=ch^2/[1+\{1-(1+k)c^2h^2\}^{1/2}]+Ah^4+Bh^6+Ch^8+Dh^{10}+\ldots$$

wherein a reference symbol h represents a distance as measured from the optical axis ($h^2=x^2+y^2$), a reference symbol c designates a curvature on a vertex, a reference symbol k denotes a conical constant, a reference symbol A represents an aspherical coefficient of the fourth order, a reference symbol B designates an aspherical coefficient of the sixth order, a reference symbol C denotes an aspherical coefficient on the eighth order and a reference symbol D represents an aspherical surface coefficient of the tenth order.

Aspherical surface coefficients and the like which are adopted for the first embodiment are specified in the numerical data.

An optical system according to a second embodiment has a composition which is the same as that of the first embodiment shown in FIG. 3 and is configured to correct camera shake by shifting an eyepiece E in a direction perpendicular to an optical axis.

The optical system according to the second embodiment is capable of correcting the camera shake by shifting the eyepiece E for a distance of 0.37 mm when an image is deviated 0.3 mm on a primary imaging surface $r_1$.

Since the eyepiece E is a plastic lens in the second embodiment, the optical system is capable of shifting this lens with ease.

However, the camera shake is not, corrected on a secondary imaging surface $r_{12}$ and a location of a visual field stop is not corrected in the second embodiment.

In the second embodiment, the composition of the optical system itself remains the same as that in the first embodiment and the values defined by the conditions (1) through (5) and (7) are the same as those in the first embodiment. Furthermore, the value defined by the condition (6) is 0.37 and satisfies the condition (6).

Aberrations at a location of a virtual image in a is condition where the eyepiece is shifted for correction of the camera shake are illustrated in FIGS. 9 through 13.

In addition, FIGS. 9, 10, 11, 12 and 13 are diagrams showing aberrations at the image heights of −1.00, −0.80, 1.00, 0.80 and 0.00 respectively.

By comparing these diagrams showing the aberrations with FIGS. 14 through 18, it will be understood that the aberrations are corrected favorably.

An optical system according to a third embodiment of the present invention has a composition illustrated in FIG. 19 and numerical data listed below:

| | | | |
|---|---|---|---|
| $r_0 = \infty$ | $d_0 = -0.06$ | | |
| $r_1 = \infty$ | $d_1 = 3.14$ | | |
| $r_2$ = aspherical surface 1 | $d_2 = 3.70$ | $n_1 = 1.4924$ | $\nu_1 = 57.7$ |
| $r_3 = -19.66$ | $d_3 = 10.68$ | | |
| $r_4 = \infty$ | $d_4 = 5.00$ | | |
| $r_5 = 7.06$ | $d_5 = 3.75$ | $n_2 = 1.6968$ | $\nu_2 = 55.5$ |
| $r_6 = -16.18$ | $d_6 = 1.80$ | | |
| $r_7 = -4.11$ | $d_7 = 0.90$ | $n_3 = 1.6727$ | $\nu_3 = 32.1$ |
| $r_8 = 10.55$ | $d_8 = 0.75$ | | |
| $r_9 = 27.89$ | $d_9 = 4.86$ | $n_4 = 1.6968$ | $\nu_4 = 55.5$ |
| $r_{10} = -7.33$ | $d_{10} = 11.05$ | | |
| $r_{11}$ = aspherical surface 2 | $d_{11} = 4.96$ | $n_5 = 1.5254$ | $\nu_5 = 55.8$ |
| $r_{12} = -79.46$ | $d_{12} = 8.15$ | | |
| $r_{13} = \infty$ | $d_{13} = 25.00$ | | |

-continued

| | | | |
|---|---|---|---|
| $r_{14}$ = aspherical surface 3 | $d_{14}$ = 3.70 | $n_6$ = 1.4924 | $v_6$ = 57.7 |
| $r_{15}$ = −44.85 | $d_{15}$ = 3.25 | | |
| $r_{16}$ = ∞ | $d_{16}$ = 1.00 | $n_7$ = 1.5163 | $v_7$ = 64.1 |
| $r_{17}$ = ∞ | $d_{17}$ = 11.09 | | |
| $r_{18}$ = stop surface | $d_{18}$ = −904.55 | | |
| $r_{19}$ = ∞ | $d_{19}$ = 0.00 | | | aspherical surface 1 radius of curvature 10.11
k = 0
A = −6.7217 × $10^{-4}$, B = 4.8326 × $10^{-6}$, C = −3.7491 × $10^{-8}$ aspherical surface 2 radius of curvature 11.84
k = 0
A = −1.5339 × $10^{-4}$, B = 1.5158 × $10^{-6}$, C = −1.3577 × $10^{-8}$ Aspherical surface 3

Figure 19:
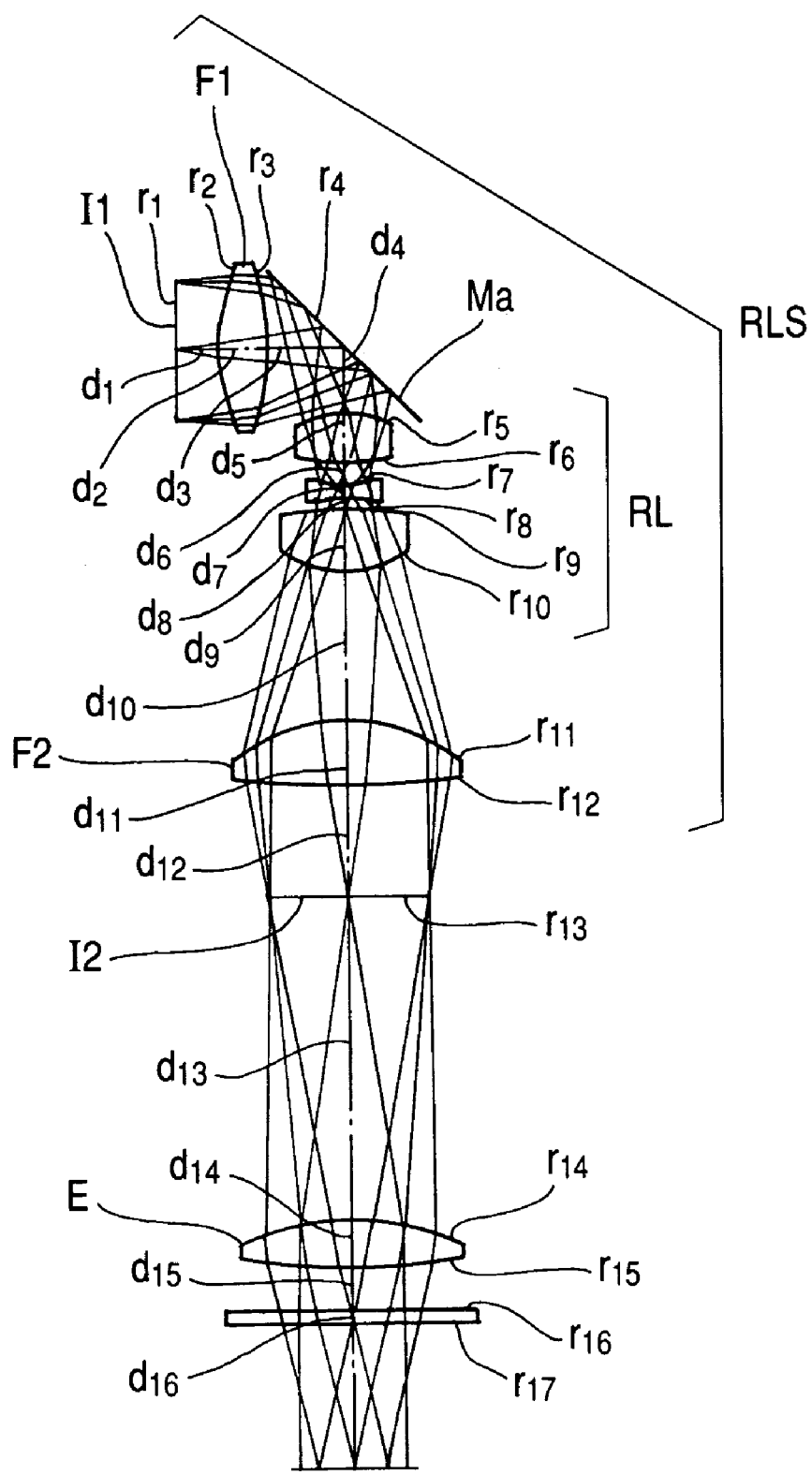
FIG. 19 is a sectional view showing a composition of a finder optical system in a third embodiment of the present invention.

Radius of curvature 17.89
k = 0
A = −3.7860 × $10^{-5}$, B = 5.2082 × $10^{-7}$, C = −5.8476 × $10^{-9}$ As shown in FIG. 19, the optical system according to the third embodiment consists of a relay optical system RLS ($r_2$ to $r_{12}$) composed of a first field lens F1 ($r_2$ to $r_3$), a relay lens component RL ($r_5$ to $r_{10}$) and a second field lens F2 ($r_{11}$ to $r_{12}$) which are disposed in order from a side of a primary image I1 formed by a photographing optical system, a secondary image I1 ($r_{13}$) relayed by the relay optical system RLS and an eyepiece E ($r_{14}$ to $r_{15}$). Furthermore, the optical system according to the third embodiment is configured to comprise a is reflecting mirror Ma ($r_4$) between the first field lens F1 and the relay lens component R1 in the relay optical system RLS, form the secondary image I2 between and the second field lens F2 and the eyepiece E, and allow to be observed a virtual image of the secondary image through the eyepiece E.

The optical system according to the third embodiment changes an angle of the reflecting mirror Ma to correct camera shake. The optical system according to the third embodiment is capable of changing an inclination angle of the reflecting mirror Ma 45°+0.926° (an angle change Δ=0.9269°), thereby correcting a shift of 0.3 mm of the primary image caused due to the camera shake.

Figure 23:
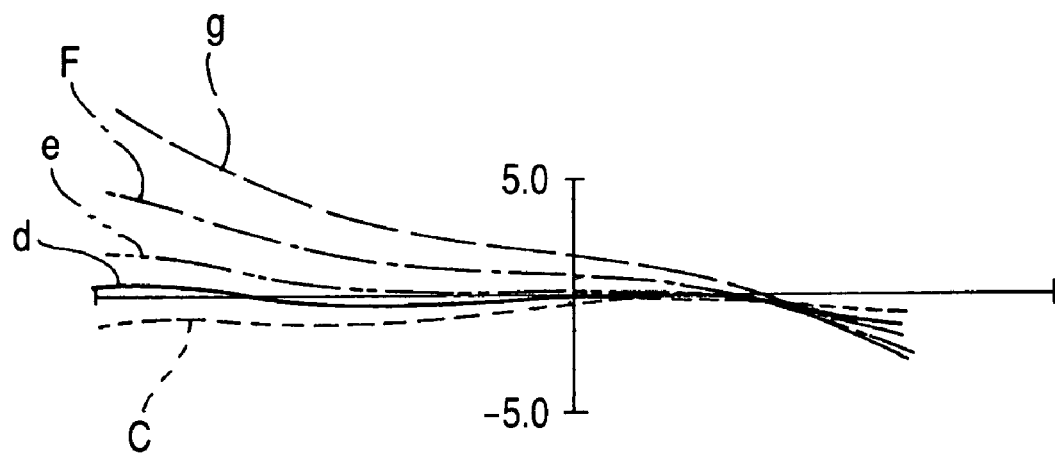
FIG. 23 is a diagram showing aberrations in the third embodiment of the present invention at the image height of −0.80.
Figure 23:
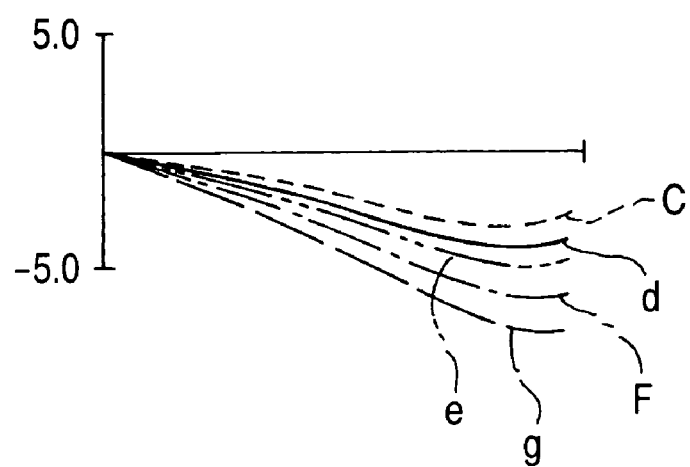
Figure 24:
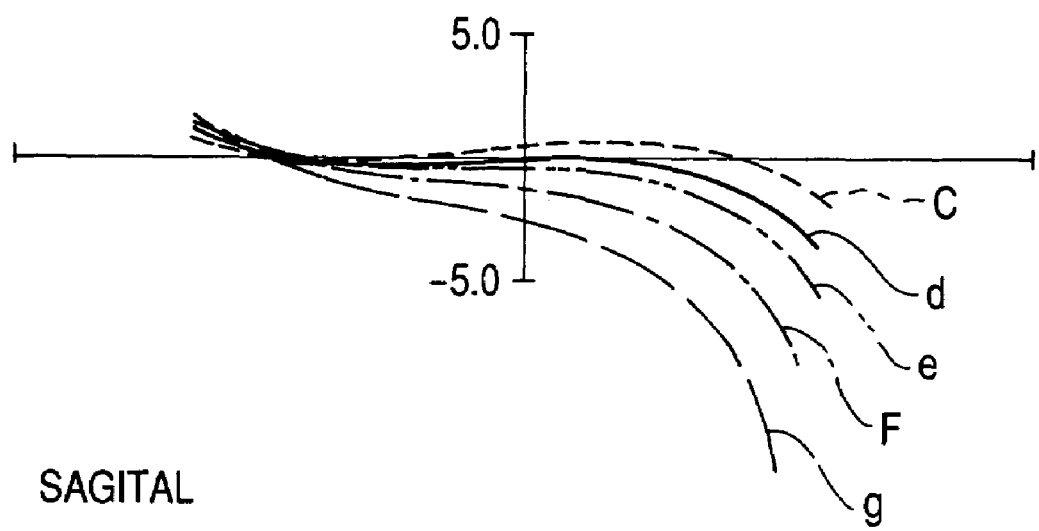
FIG. 24 is a diagram showing aberrations in the third embodiment of the present invention at the image height of 1.00.
Figure 24:
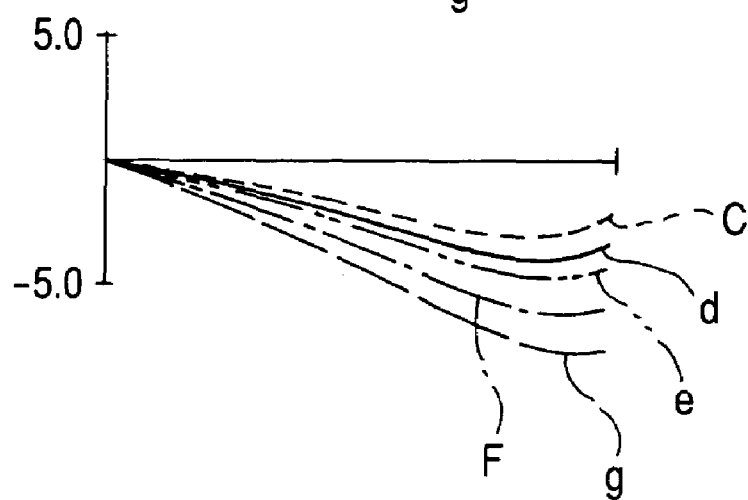
Figure 25:
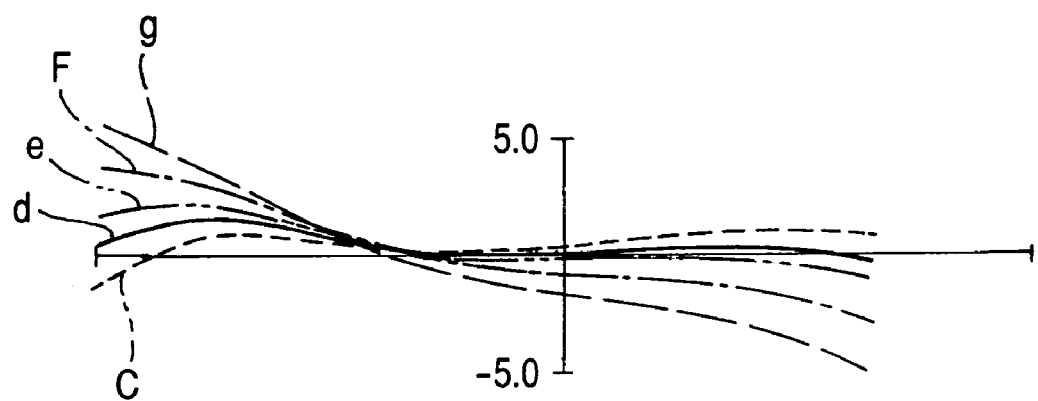
FIG. 25 is a diagram aberrations in the third embodiment of the present invention at the image height of 0.80.
Figure 25:
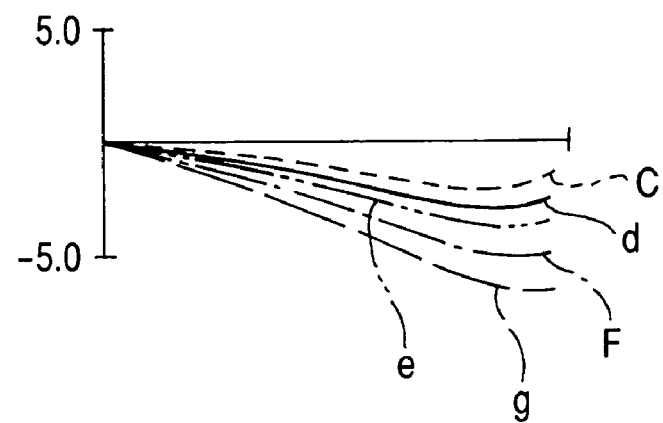
Figure 26:
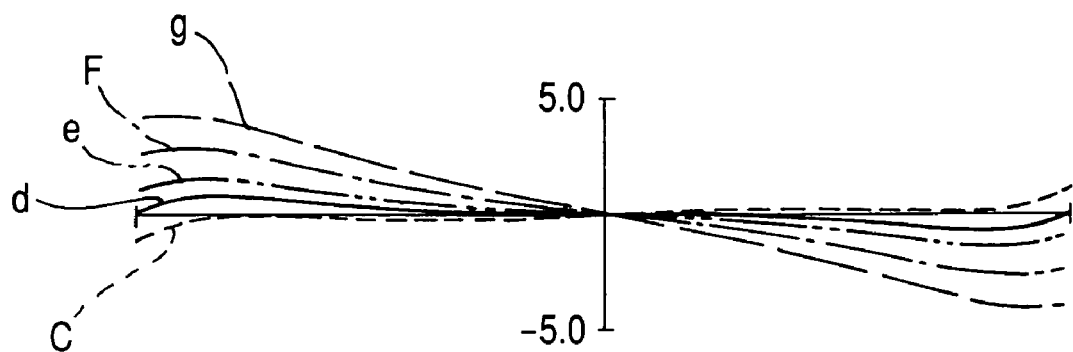
FIG. 26 is a diagram showing aberrations in the third embodiment of the present invention at the image height of 0.00.
Figure 26:
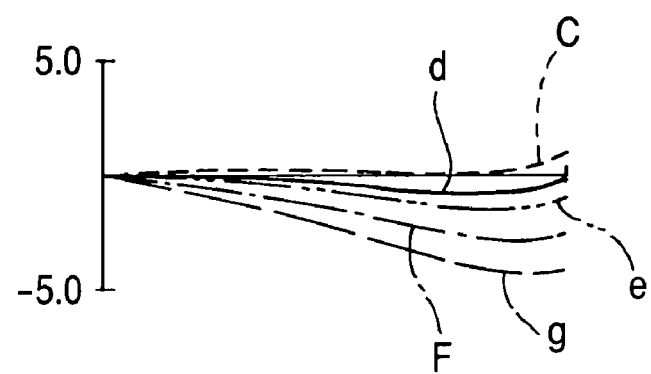
Figure 27:
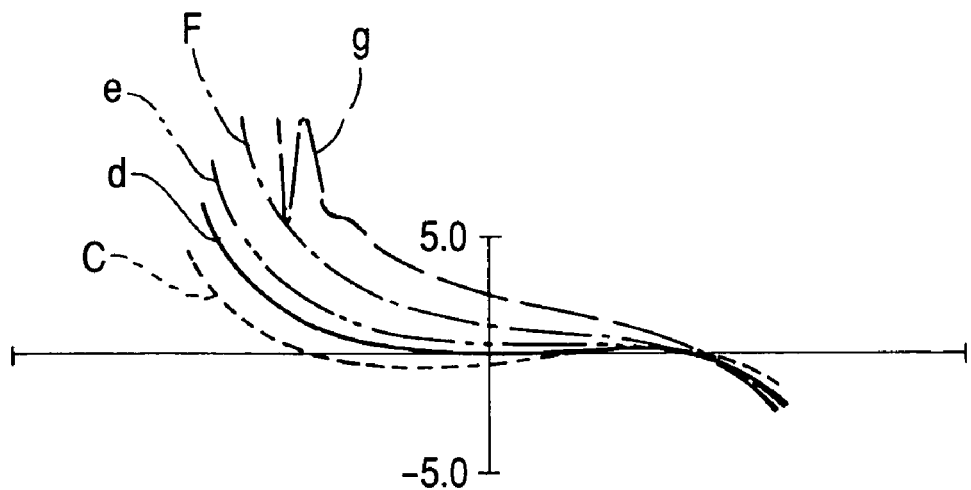
FIG. 27 is a diagram showing aberrations in the fourth embodiment of the present invention at the image height of −1.00.
Figure 27:
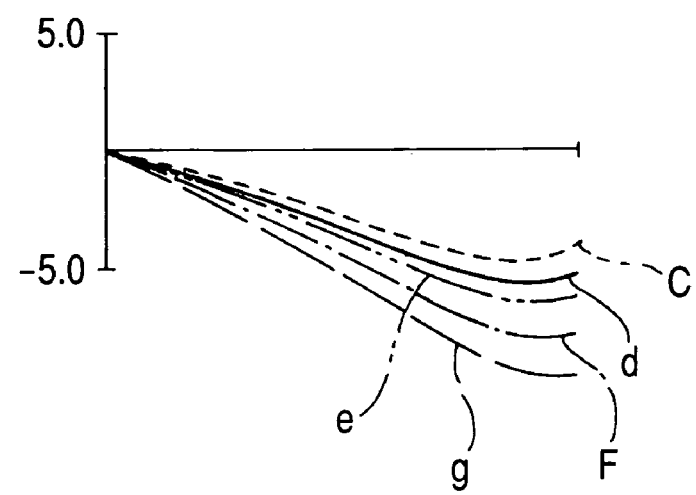
Figure 28:
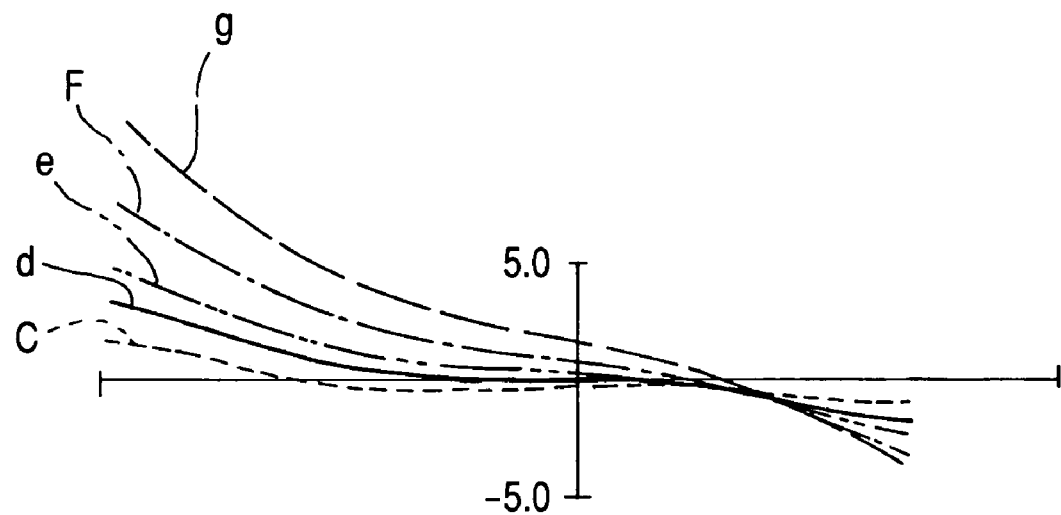
FIG. 28 is a diagram showing aberrations in the fourth embodiment of the present invention at the image height of −0.80.
Figure 28:
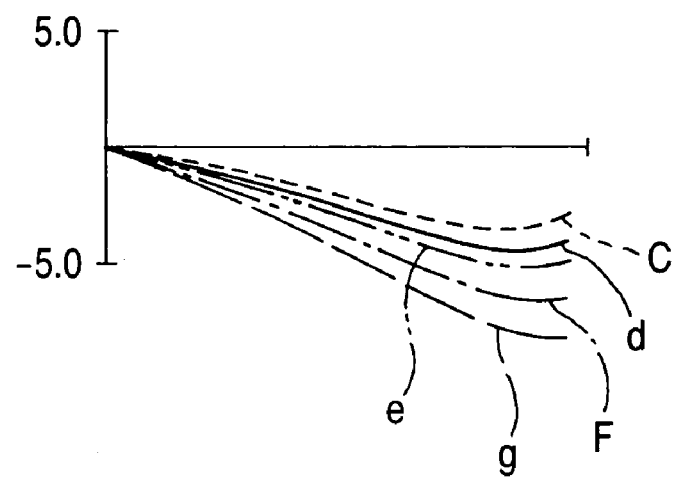
Figure 29:
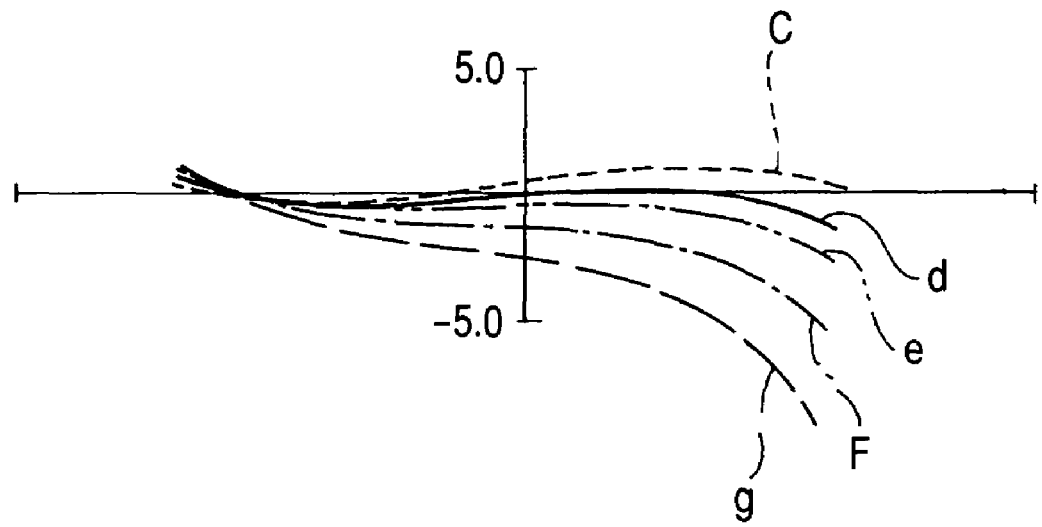
FIG. 29 is a diagram showing aberrations in the fourth embodiment of the present invention at the image height of 1.00.
Figure 29:
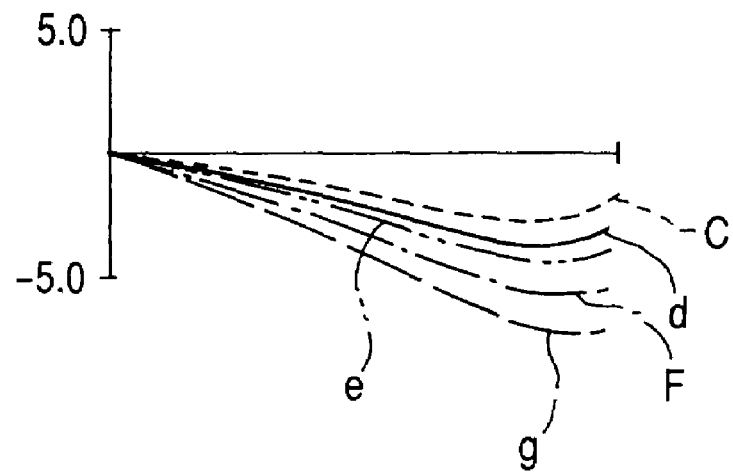
Figure 30:
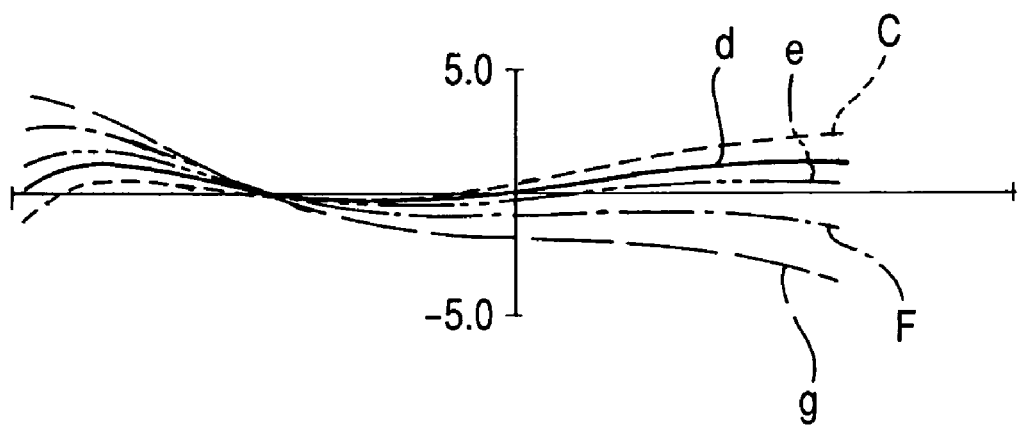
FIG. 30 is a diagram showing aberrations in the fourth embodiment of the present invention at the image height of 0.80.
Figure 30:
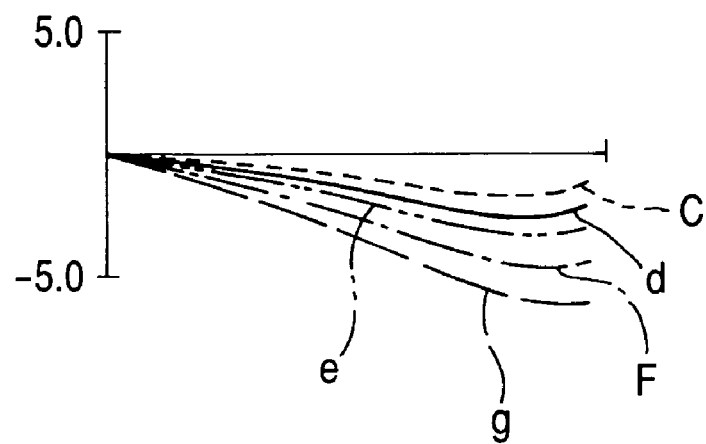
Figure 31:
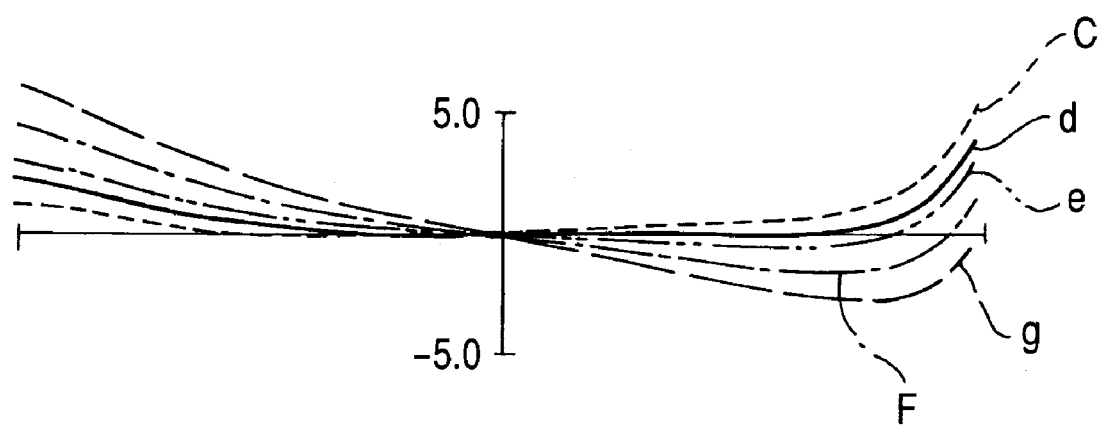
FIG. 31 is a diagram showing aberrations in the fourth embodiment of the present invention at the image height of 0.00.
Figure 31:
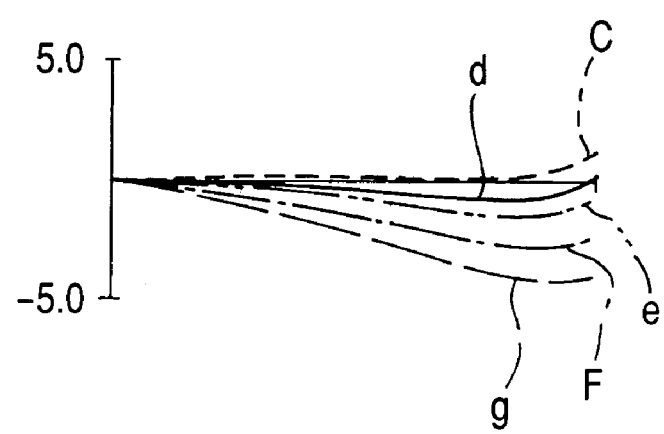
Figure 32:
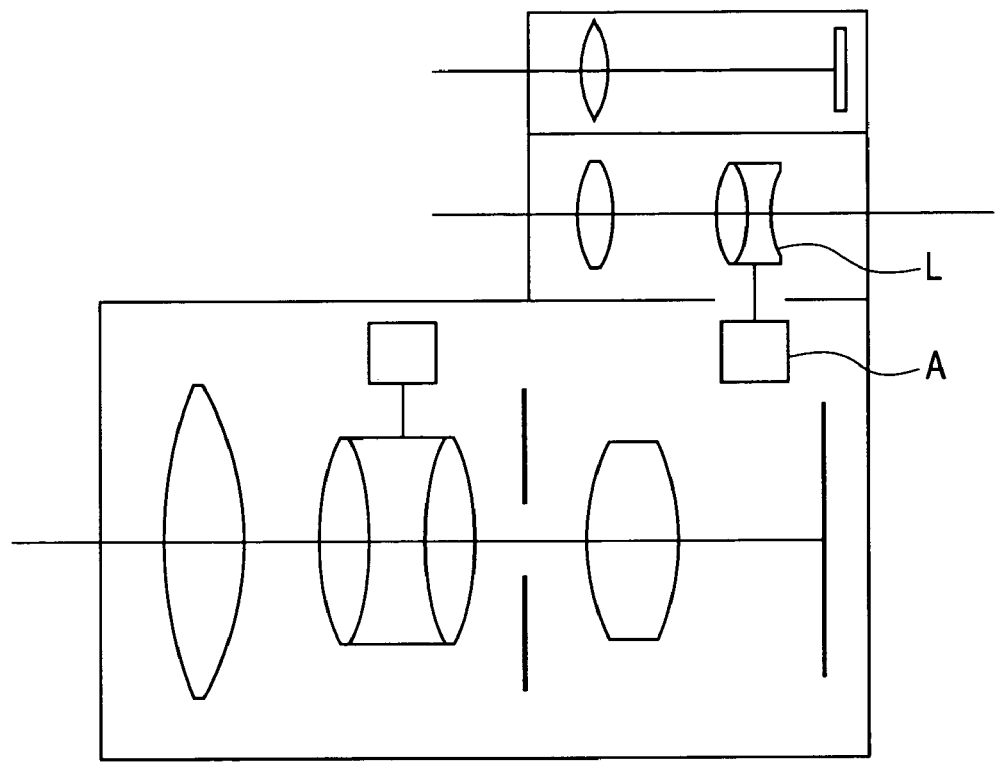
FIG. 32 is a diagram showing a composition of a conventional optical system which has a camera shake correction function.
Figure 33:
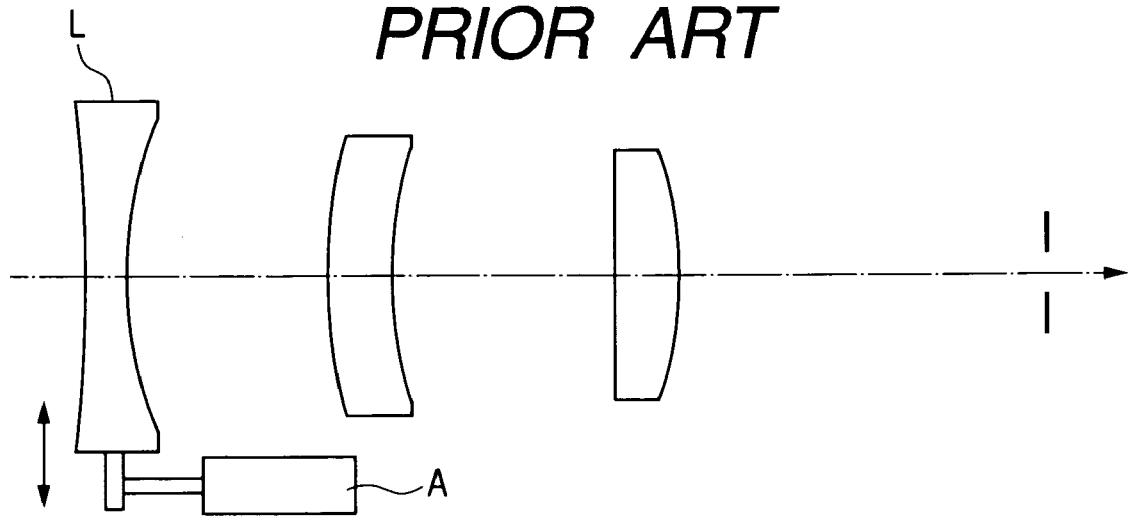
FIG. 33 is a sectional view showing a composition of the conventional optical system which has the camera shake correction function.
Figure 34:
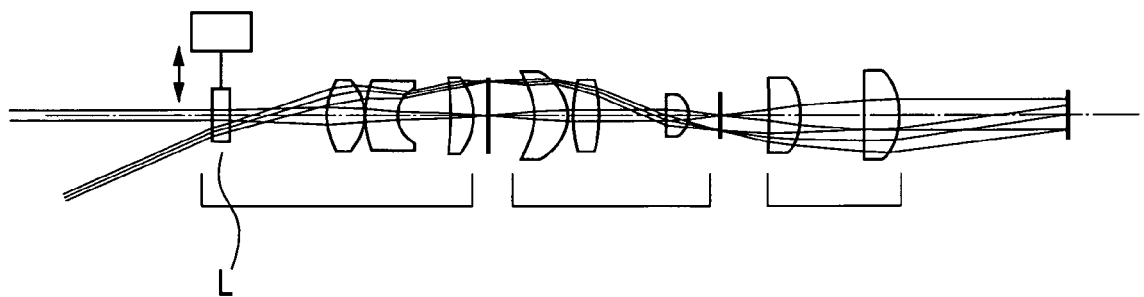
FIG. 34 is a sectional view showing a composition of another conventional optical system which has a camera shake correction function.
Figure 35:
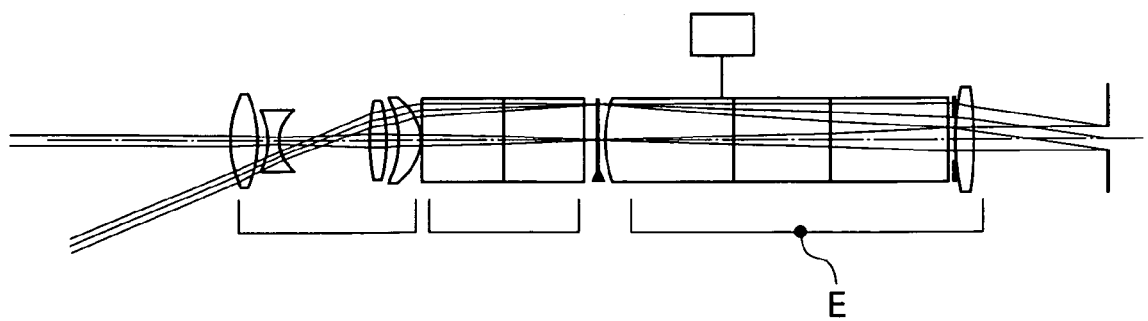
FIG. 35 is a sectional view showing a composition of still another conventional optical system which has a camera shake correction function.

FIGS. 22, 23, 24, 25 and 26 show aberration conditions in the optical system according to the third embodiment when the camera shake is corrected with the reflecting mirror Ma as described above. Out of these drawings, FIG. 23 shows lateral aberrations at an image height of −1.00 taking a maximum image height at a location of the virtual image as 1.00. FIGS. 24, 25, 26 and 27 show lateral aberrations at image heights of −0.80, 1.00, 0.80 and 0.00. Furthermore, aberration conditions in a basic state of the optical system according to the third embodiment (in a condition where the reflecting mirror Ma has an inclination angle of 45°) are illustrated in FIGS. 14, 15, 16, 17 and 18. These drawings similarly show lateral aberrations at −1.00, −0.80, 1.00, 0.80 and 0.00.

From FIGS. 22 through 26 and FIGS. 14 through 18, it will be understood that aberrations are aggravated little when the inclination angle of the reflecting mirror Ma is changed for correcting the camera shake in the optical system according to the third embodiment.

The optical system according to the third embodiment in which the reflecting mirror Ma to be used for the camera shake correction is disposed on a side of an actual pupil of the optical system is capable of lessening aggravation of aberrations caused by changing the inclination angle of the reflecting mirror for the camera shake correction. Furthermore, the optical system has a small effective diameter in the vicinity of the pupil and allows the mirror to have a small diameter, thereby lessening a burden on an actuator.

The reflecting mirror Ma has an effective diameter of 14.7 mm in the third embodiment Furthermore, the reflecting mirror Ma has an effective diameter of 14.4 mm when the reflecting mirror is disposed at a location which is deviated from the location specified in the numeral data to a side of the relay lens component R1 (toward $r_5$).

Figure 20:
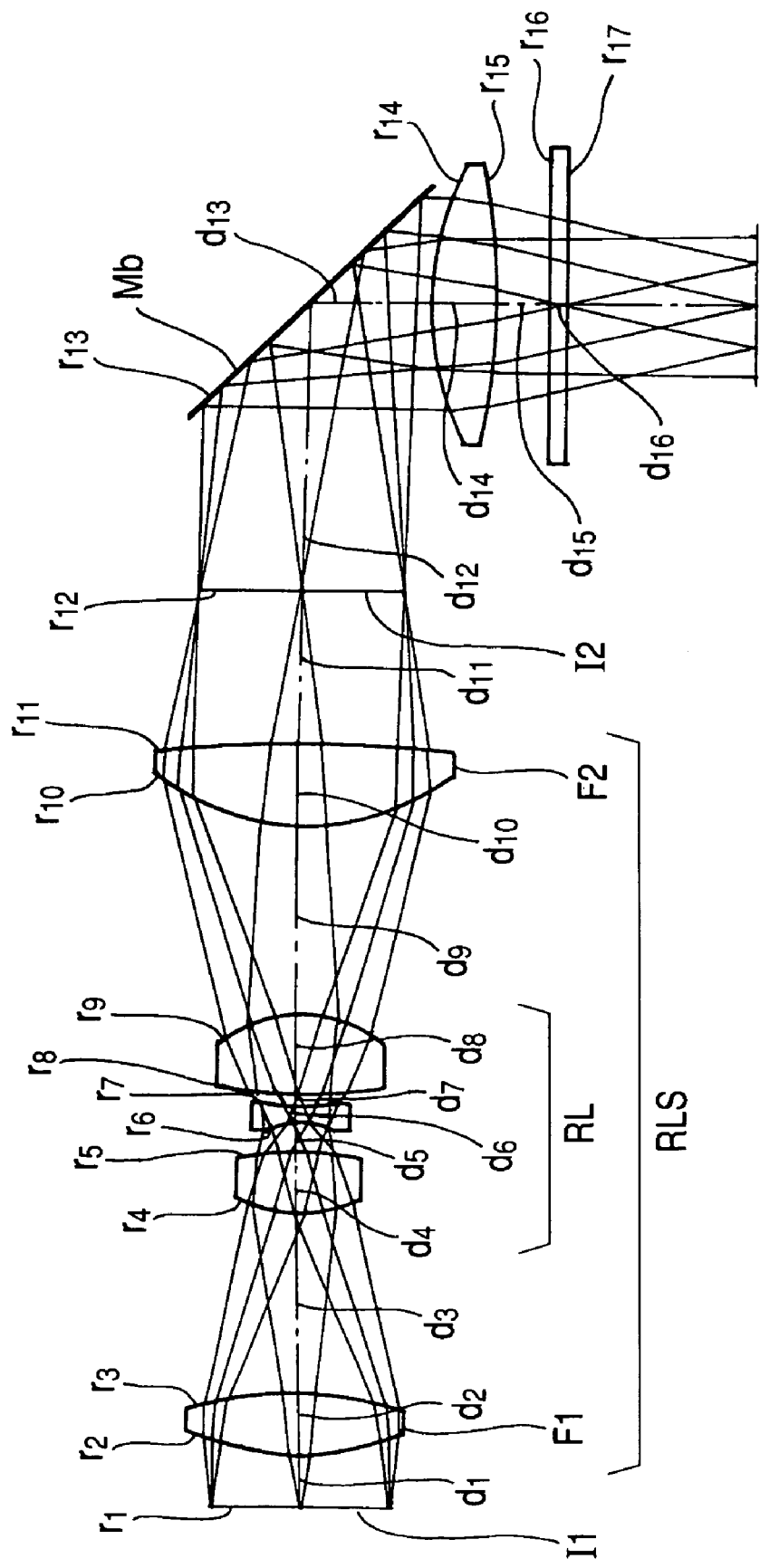
FIG. 20 is a sectional view showing a composition of a finder optical system in a fourth embodiment of the present invention.

An optical system according to a fourth embodiment of the present invention has a composition shown in FIG. 20 and numerical data listed below:

| | | | |
|---|---|---|---|
| $r_0$ = ∞ | $d_0$ = −0.06 | | |
| $r_1$ = ∞ | $d_1$ = 3.14 | | |
| $r_2$ = aspherical surface 1 | $d_2$ = 3.70 | $n_1$ = 1.4924 | $v_1$ = 57.7 |
| $r_3$ = −19.66 | $d_3$ = 10.68 | | |
| $r_4$ = 7.06 | $d_4$ = 3.75 | $n_2$ = 1.6968 | $v_2$ = 55.5 |
| $r_5$ = −16.18 | $d_5$ = 1.80 | | |
| $r_6$ = −4.11 | $d_6$ = 0.90 | $n_3$ = 1.6727 | $v_3$ = 32.1 |
| $r_7$ = 10.55 | $d_7$ = 0.75 | | |
| $r_8$ = 27.89 | $d_8$ = 4.86 | $n_4$ = 1.6968 | $v_4$ = 55.5 |
| $r_9$ = −7.33 | $d_9$ = 11.05 | | |
| $r_{10}$ = aspherical surface 2 | $d_{10}$ = 4.96 | $n_5$ = 1.5254 | $v_5$ = 55.8 |
| $r_{11}$ = −79.46 | $d_{11}$ = 8.15 | | |
| $r_{12}$ = ∞ | $d_{12}$ = 25.00 | | |
| $r_{13}$ = ∞ | $d_{13}$ = 7.00 | | |
| $r_{14}$ = aspherical surface 3 | $d_{14}$ = 3.70 | $n_6$ = 1.4924 | $v_6$ = 57.7 |
| $r_{15}$ = −44.85 | $d_{15}$ = 3.25 | | |
| $r_{16}$ = ∞ | $d_{16}$ = 1.00 | $n_7$ = 1.5163 | $v_7$ = 64.1 |
| $r_{17}$ = ∞ | $d_{17}$ = 11.09 | | |
| $r_{18}$ = stop surface | $d_{18}$ = −904.55 | | |
| $r_{19}$ = ∞ | $d_{19}$ = 0.00 | | | aspherical surface 1 radius of curvature 10.11
k = 0
A = −6.7217 × $10^{-4}$, B = 4.8326 × $10^{-6}$, C = −3.7491 × $10^{-8}$ aspherical surface 2 radius of curvature 11.84
k = 0
A = −1.5339 × $10^{-4}$, B = 1.5158 × $10^{-6}$, C = −1.3577 × $10^{-8}$ Aspherical surface 3

Radius of curvature 17.89
k = 0
A = −3.7860 × $10^{-5}$, B = 5.2082 × $10^{-7}$, C = −5.8476 × $10^{-9}$ The optical system according to the fourth embodiment has a composition which is the same as that of the optical system according to the third embodiment, Consists of a relay optical system RLS ($r_2$ to $r_{11}$) and an eyepiece E ($r_{14}$ to $r_{18}$), and uses a reflecting mirror Mb ($r_{13}$) disposed in a section from a secondary image I2 ($r_{12}$) which is to be formed between the relay optical system RLS and the eyepiece E to the eyepiece E. This optical system is characterized in that an inclination angle of the reflecting mirror Mb is changed for correcting camera shake.

The optical system according to the fourth embodiment is capable of correcting a 0.3 mm shift of a primary image due to camera shake by an inclination angle is change of Δα=−0.570°, or a change of the Inclination angle of the reflecting mirror Mb from 45°to 45°−0.570°. Furthermore, the reflecting mirror Mb is disposed at a location close to the eyepiece E in the optical system according to the fourth embodiment so that the mirror has a small diameter. Speaking concretely, the optical system has a composition in which the mirror Mb is disposed at a location shown in FIG. 20 in which the mirror has an effective diameter of 18.0 mm.

FIGS. 27, 28, 29, 30 and 31 show Aberrations conditions in the optical system according to the fourth embodiment in a condition where the inclination angle of the reflecting mirror Mb is changed for the camera shake correction. The aberrations shown in FIGS. 27, 28, 29, 30 and 31 are lateral aberrations at image heights of −1.00, −0.80, 1.00, 0.80 and 0.00 taking a maximum image height on a virtual image as 1.00.

The optical system according to the fourth embodiment in which the reflecting mirror Mb ($r_{13}$) is disposed at a location apart from the secondary image I2 ($r_{12}$) is configured so as to be capable of correcting the camera shake even by a small change (Δ=−0.570°) of the inclination angle.

A mirror which has a variable shape may be used as the reflecting mirror in the optical system according to the third or fourth embodiment. Furthermore, it is possible to dispose two mirrors; one having a variable shape and the other ordinary reflecting mirror, correct camera shake by changing an inclination angle of the ordinary reflecting mirror and compensate aggravation of aberrations at that time by changing the shape of the mirror having the variable shape.

An organic-inorganic hybrid material is used for the first field lens and the like in the optical systems according to the third and fourth embodiments. This organic-inorganic hybrid material is an inorganic material in which an organic material is dispersed or an organic material in which an inorganic material is dispersed. Accordingly, the organic-inorganic hybrid material has a melting point lower than that of glass, can be molded at a low temperature and permits mass production of lenses at a low cost.

Furthermore, this organic-inorganic hybrid material is usable as an optical material having a refractive index and a dispersion coefficient which are lower and higher than those of glass, and has excellent heat resistance. Moreover, the organic-inorganic hybrid material is hardly injurable and is usable as a material for a front lens of an optical system.

It is therefore desirable to use this organic inorganic hybrid material for lenses such as those described above which have aspherical surfaces.

Furthermore, the lenses which have the aspherical surfaces may be made of a plastic material. The plastic material permits mass production of lenses by a plastic molding method. In such a case, the plastic material which is available at a low price permits manufacturing lenses and optical systems at low costs. Furthermore, the plastic material which has a smaller weight than glass permits manufacturing optical systems having small weights.

All the lenses of the optical systems according to the present invention can be made of a plastic material. Accordingly, all lenses of the optical systems can be manufactured easily in a large quantity by the plastic molding method. In this case, the plastic material which is available at the low price can provide the optical system at an extremely low price.

For the optical systems according to the third and fourth embodiments, the values defined by the above-mentioned conditions (1) through (7) are as listed below:

$t1/f1=14.9$ $t2/f2=3.59$ $|t1/f1|>|t2/f2|$ $s1/f1=3.2/14.1=0.23$ $s2/f2=8.15/20=0.41$ $T=0.27$ $\Delta\alpha=0.93°$ (Embodiment 1)

$\Delta\alpha=0.03°$ (Embodiment 2)

$\beta=1.19$

As apparent from the values listed above, the third and fourth embodiments satisfy all of the conditions (1) through (8).

In these embodiments, an effective diameter of a relay lens component and the like are as listed below:

Effective diameter of relay lens component=8.4 mm

Maximum effective diameter of finder optical system=15.5 mm

Effective diameter of relay lens component/maximum effective diameter of finder optical system=0.54

Furthermore, used in these embodiments are rotationally symmetrical aspherical surfaces as an object side surface ($r_2$) of the first field lens F1, an object side surface ($r_{10}$) of the second field lens and an object side surface ($r_{13}$) of the eyepiece E.

The aspherical surfaces are expressed by the following formula;

$$z=ch^2/[1+\{1-(1+k)c^2h^2\}^{1/2}]+Ah^4+Bh^6+Ch^8+Dh^{10}+\ldots$$

wherein a reference symbol h represents a distance as measured from an optical axis ($h^2=x^2+y^2$), a reference symbol c designates a radius of curvature on a vertex, a reference symbol k denotes a conical constant, a reference symbol A represents an aspherical surface coefficient of the fourth order, a reference symbol B designates an aspherical surface coefficient of the sixth order, a reference symbol C denotes an aspherical surface coefficient of the eights order and a reference symbol D represents an aspherical surface coefficient of the tenth order.

The aspherical surface coefficients and the like adopted for the embodiments are specified in the numerical data described above.

Figure 21:
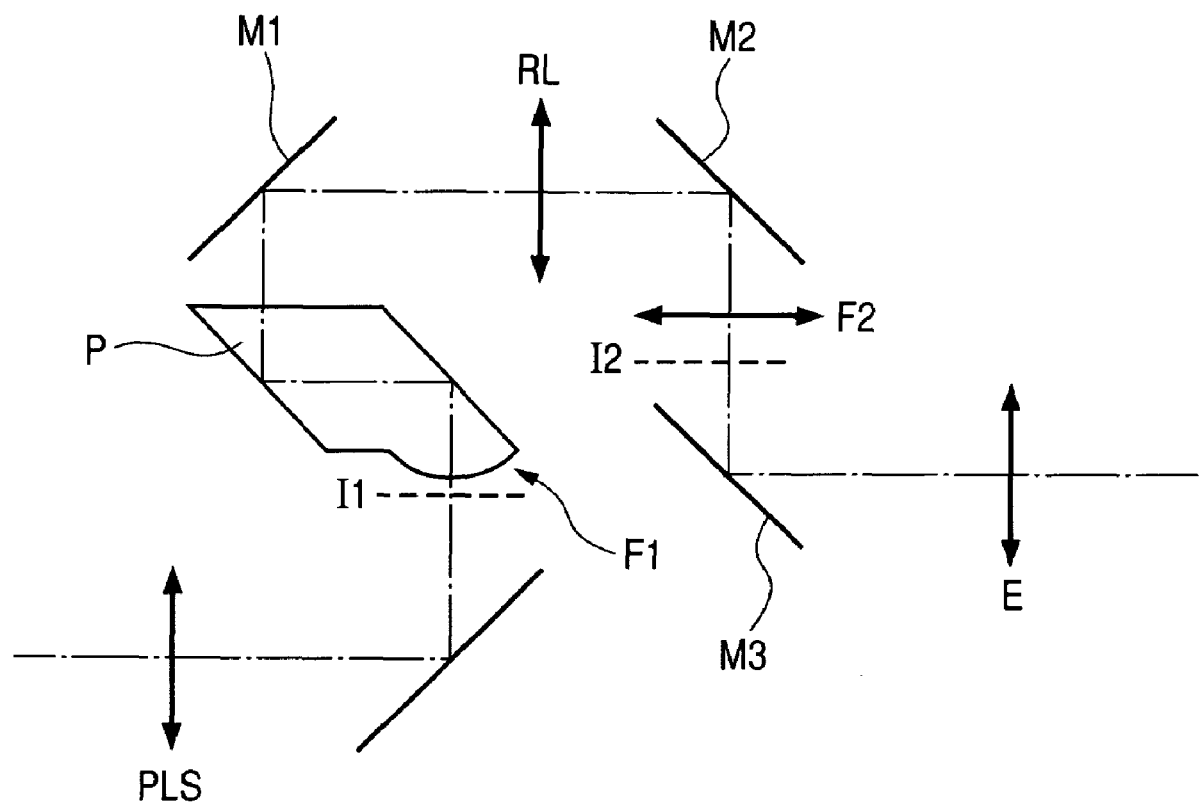
FIG. 21 is a diagram showing a composition of a fifth embodiment of the present invention.
Figure 22:
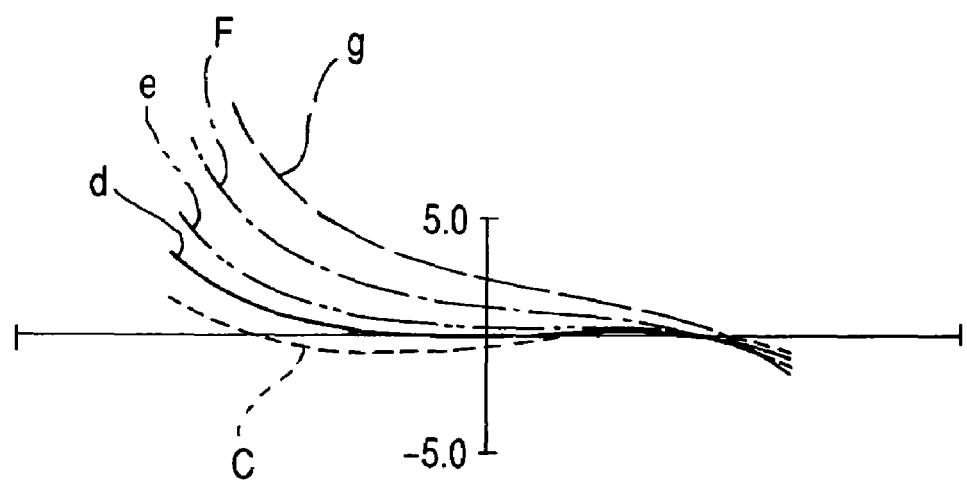
FIG. 22 is a diagram showing aberrations in the third embodiment of the present Invention at the image height of 1.00.
Figure 22:
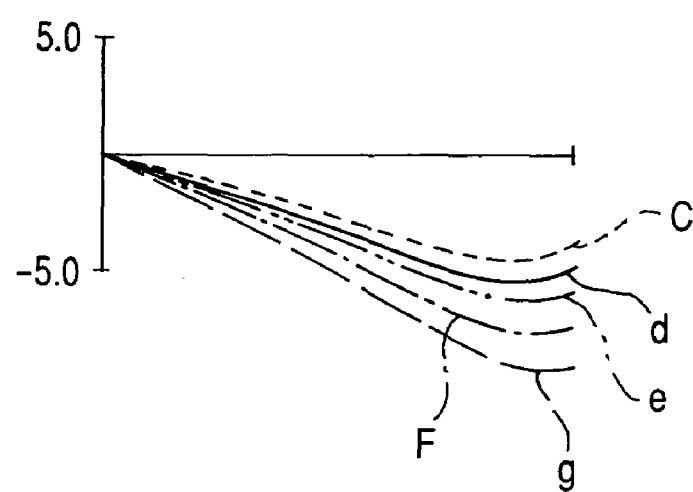

FIG. 21 shows an outline of a fifth embodiment.

Disposed in an optical system according to the fifth embodiment are six reflecting mirrors as shown in FIG. 21.

In FIG. 21, a reference symbol PLS represents a photographing optical system, a reference symbol M1 designates optical path splitting means, a reference symbol I1 denotes a primary image, a reference symbol P represents a prism which has two totally reflecting surfaces M2 and M3, a reference symbol M4 designates a fourth reflecting mirror, a reference symbol RL denotes a relay lens, a reference symbol M5 represents a reflecting mirror, a reference symbol F2 designates a second field lens, a reference symbol I2 denotes a secondary image, a reference symbol M6 represents a sixth mirror and a reference symbol E designates an eyepiece.

Furthermore, a surface of incidence of the prism P for deflecting an optical path is configured as a convex surface which is to function as a first field lens F1.

The optical system according to the fifth embodiment is capable of correcting camera shake by changing an inclination of the mirror M4 or M5 like the optical systems according to the third and fourth embodiments.

The optical system according to the present invention which is preferably usable for photographing apparatuses such as a digital camera and a digital video camera is equipped with camera shake correction function disposed in a finder optical system in addition to camera shake correction means disposed in an image pickup device, thereby being capable of favorably correcting camera shake with a simple composition. The optical system according to the present invention is capable of correcting the camera shake by shifting an adequate lens element or a lens component disposed in the finder optical system with a light burden on a driving mechanism and little aggravation of aberrations, thereby permitting observing an image through the finder optical system in a condition free from the camera shake.

When camera shake correction means is disposed in a finder optical system as in the optical system according to the present invention, it is possible to prevent a visual field observed through a finder from being blurred at a time of photographing at a magnification higher than 1×, thereby facilitating framing at the time of photographing. Furthermore, since the finder optical system has a diameter which is smaller than that of a photographing optical system, it is possible to configure compact driving means which constitutes camera shake correction means by disposing the camera shake correction means on a lens composing the finder optical system. Furthermore, since the photographing optical system has the camera shake correction function in the image pickup device, the optical system according to the present invention is capable of preventing imaging performance and an image shape from being degraded and asymmetrical due to the camera shake correction in the photographing optical system.

The optical system according to the present invention which is usable preferably for photographing apparatuses such as a digital camera and digital video camera uses the photographing optical system equipped with the optical path splitting means for splitting the optical path to the finder optical system, performs camera shake correction by changing an inclination angle of the optical path deflecting reflecting mirror disposed in the finder optical system arranged after the optical path splitting and uses the driving mechanism for changing the inclination angle of the reflecting mirror for the camera shake correction in addition to the camera shake correction means disposed in the image pickup device, thereby allowing an image free from the camera shake to be observed favorably with little aggravation of aberrations due to the camera shake correction.

The invention claimed is:

1. An optical system comprising:
   a photographing optical system;
   a finder optical system;
   optical path changing means for changing an optical path from said photographing optical system to said finder optical system; and
   camera shake correction means disposed in said finder optical system,
   wherein said finder optical system has an eyepiece for observing a secondary image which is obtained by imaging an image of an object twice.

2. The optical system according to claim 1, comprising an image pickup device, wherein camera shake correction means for the photographing optical system is disposed in said image pickup device.

3. The optical system according to claim 1, wherein said camera shake correction means has a driving mechanism which moves said eyepiece on a plane perpendicular to an optical axis of said finder optical system.

4. An optical system comprising:
   a photographing optical system;
   a finder optical system;
   optical path changing means for changing an optical path from said photographing optical system to said finder optical system; and
   camera shake correction means disposed in said finder optical system,
   wherein said finder optical system consists of a lens element or a lens component composed of a plurality of lens elements, wherein said camera shake correction means moves said lens element or said lens component on a plane perpendicular to an optical axis of said finder optical system, and wherein an effective diameter of said lens or said lens component which is moved by said camera shake correction means is not larger than 70% of a maximum effective diameter of said finder optical system.

5. An optical system comprising:
   a photographing optical system;
   a finder optical system;
   optical path changing means for changing an optical path from said photographing optical system to said finder optical system; and
   camera shake correction means disposed in said finder optical system,
   wherein said finder optical system consists of a lens element or a lens component composed of a plurality of lens elements, wherein said camera shake correction means moves said lens element or said lens component on a plane perpendicular to an optical axis of said finder optical system, and wherein said lens element or said lens component which is moved by said camera shake correction means comprises a pupil.

6. An optical system comprising:
   a photographing optical system;
   a finder optical system;
   optical path changing means for changing an optical path from said photographing optical system to said finder optical system; and
   camera shake correction means disposed in said finder optical system,
   wherein said finder optical system consists of a lens element or a lens component composed of a plurality of lens elements, wherein said camera shake correction means moves said lens element or said lens component on a plane perpendicular to an optical axis of said finder optical system, and wherein said lens element or said lens component which is moved by said camera shake correction means comprises lenses disposed before an actual pupil or lenses disposed after an actual pupil.

7. An optical system comprising:
   a photographing optical system;
   a finder optical system;
   optical path changing means for changing an optical path from said photographing optical system to said finder optical system; and
   camera shake correction means disposed in said finder optical system,
   wherein said finder optical system comprises a relay optical system, a secondary imaging surface on which a secondary image is to be formed by imaging twice an image of an object to be photographed and an eyepiece for observing the secondary image formed on said secondary imaging surface in order from a primary imaging surface on which a primary image of the object to be photographed is to be formed by said photographing optical system, and wherein said camera shake correction means is disposed on a side of said primary imaging surface as seen from said secondary imaging surface.

8. The optical system according to claim 7, wherein said camera shake correction means has a driving mechanism which moves said relay optical system on a plane perpendicular to an optical axis of said finder optical system.

9. The optical system according to claim 7, wherein an exit pupil of said relay optical system is formed on an observer's eye side as seen from said secondary imaging surface.

10. The optical system according to claim 7, wherein said relay optical system comprises a positive lens and a negative lens.

11. The optical system according to claim 7, wherein said relay optical system comprises a field lens, a relay lens component consisting of a single lens element or a plurality of lens elements and wherein said camera shake correction means moves a portion of said relay lens component or the relay lens component as a whole in a plane perpendicular to the optical axis of said finder optical system.

12. The optical system according to claim 11, wherein said field lens comprise a first field lens element and a second field lens element, and wherein said relay optical system comprises said first field lens element, said relay lens component and said second field lens element in this order.

13. The optical system according to claim 7, wherein said relay optical system comprises a first field lens, a relay lens and a second field lens.

14. The optical system according to claim 13 satisfying the following conditions (1) and (2):

$$|t1/f1|>2 \quad (1)$$

$$|t2/f2|>2 \quad (2)$$

wherein a reference symbol t1 represents a distance as measured from the primary imaging surface to a location of an exit pupil, a reference symbol f1 designates a focal length of the first field lens, a reference symbol t2 designates a distance as measured from the secondary imaging surface to an entrance pupil and a reference symbol f2 represents a focal length of the second field lens.

15. The optical system according to claim 13, wherein said finder optical system consists of a first field lens, a relay optical system and a second field lens, and wherein said finder optical system satisfies the following conditions (4) and (5):

$$s1/f1>0.1 \quad (4)$$

$$s2/f2 \geq 0.1 \quad (5)$$

wherein a reference symbol s1 represents a distance as measured from the primary imaging surface to the first field lens and a reference symbol s2 designates a distance as measured from the secondary imaging surface to the second field lens.

16. The optical system according to claim 13, wherein a lens element or a lens component which is to be shifted for camera shake correction satisfies the following condition (6):

$$0.3\Delta \leq T \leq 3\Delta \quad (6)$$

wherein a reference symbol T represents a shift amount for the camera shake correction and a reference symbol $\Delta$ designates a blur amount of the primary image.

17. The optical system according to claim 13, comprising an optical path deflecting prism, wherein a surface of incidence or a surface of emergence of said optical path deflecting prism constitutes the first field lens or the second field lens.

18. An optical system comprising:
a photographing optical system;
a finder optical system;
optical path changing means for changing an optical path from said photographing optical system to said finder optical system; and
camera shake correction means disposed in said finder optical system,
wherein said finder optical system consists of a lens element or a lens component composed of a plurality of lens elements, wherein said camera shake correction means moves said lens element or said lens component on a plane perpendicular to an optical axis of said finder optical system, wherein said lens element or said lens component which is moved by said camera shake correction means comprises lenses before and after an actual pupil, wherein said relay optical system comprises a field lens, a relay lens component consisting of a single lens element or a plurality of lens elements, wherein said camera shake correction means moves a portion of said relay lens component or the relay lens component as a whole in a plane perpendicular to the optical axis of said finder optical system, wherein said field lens comprise a first field lens element and a second field lens element, wherein said relay optical system comprises said first field lens element, said relay lens component and said second field lens element in this order; and wherein the optical system satisfies the following conditions (1) and (2):

$$|t1/f1|>2 \quad (1)$$

$$|t2/f2|>2 \quad (2)$$

wherein a reference symbol t1 represents a distance as measured from the primary imaging surface to a location of an exit pupil, a reference symbol f1 designates a focal length of the first field lens, a reference symbol t2 designates a distance as measured from the secondary imaging surface to an entrance pupil and a reference symbol f2 represents a focal length of the second field lens.

* * * * *